(12) United States Patent
Couture et al.

(10) Patent No.: US 12,157,396 B2
(45) Date of Patent: *Dec. 3, 2024

(54) SYSTEM AND METHOD FOR DESIGNING AND CONTROLLING A DUAL ENERGY STORAGE SYSTEM

(71) Applicant: Electra Vehicles, Inc., Boston, MA (US)

(72) Inventors: Thomas James Couture, Huntington, VT (US); Akhilesh Bakshi, Cambridge, MA (US); Jacob M. Berliner, Somerville, MA (US); Nicoló Michele Brambilla, Brookline, MA (US); Fabrizio Martini, Boston, MA (US)

(73) Assignee: Electra Vehicles, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,949

(22) Filed: May 8, 2023

(65) Prior Publication Data

US 2023/0302962 A1    Sep. 28, 2023

Related U.S. Application Data

(63) Continuation of application No. 16/956,543, filed as application No. PCT/US2018/067385 on Dec. 21, 2018, now Pat. No. 11,685,291.

(Continued)

(51) Int. Cl.
*H02J 7/00* (2006.01)
*B60L 58/20* (2019.01)
(Continued)

(52) U.S. Cl.
CPC .......... *B60L 58/20* (2019.02); *H02J 7/00712* (2020.01); *G06F 2119/06* (2020.01); *H02J 3/32* (2013.01)

(58) Field of Classification Search
CPC .. H02J 3/32; H02J 7/00712; H02J 7/34; H02J 7/342; H02J 50/001; H02J 50/005;
(Continued)

(56) References Cited

U.S. PATENT DOCUMENTS 9,502,742 B2 * 11/2016 Drenckhahn .......... H01M 12/08
11,685,291 B2 * 6/2023 Couture ................. G06Q 50/06
700/13

(Continued)

OTHER PUBLICATIONS

International Search Report and Written Opinion from the International Searching Authority for International Application No. PCT/US2018/067385 mailed Apr. 30, 2019.
(Continued)

*Primary Examiner* — Binh C Tat
(74) *Attorney, Agent, or Firm* — PIERCE ATWOOD LLP

(57) ABSTRACT

An electrical storage system comprises a first energy storage system and a second energy storage system having a lower electrical energy density and a higher rated electrical power output capability than the first energy storage system, at least one electrical power sensor configured to sense over a plurality of time intervals, electrical power usage information for a load electrically coupled to the first energy storage system and the second energy storage system, and at least one computer processor programmed to determine based, at least in part, on the sensed electrical power usage information and a power requirement of the load in a current time interval, charging/discharging parameters for each of the first energy storage system and the second energy storage system, and control charging/discharging of each of the first and second energy storage systems in accordance with the determined charging/discharging parameters during the current time interval.

16 Claims, 26 Drawing Sheets

Related U.S. Application Data

(60) Provisional application No. 62/609,553, filed on Dec. 22, 2017.

(51) Int. Cl.
*G06F 119/06* (2020.01)
*H02J 3/32* (2006.01)

(58) Field of Classification Search
CPC . H02J 50/12; H02J 50/50; H02J 50/70; Y04S 40/20; Y04S 50/14; Y02E 60/10; Y02E 10/30; G06F 3/013; G06F 3/011; G06F 3/017; G06F 1/163; G06F 3/012; G06F 2203/011; G06F 3/0346; G06F 11/3006; G06F 11/3027; G06F 11/3051; G06F 2119/06; G06F 2203/012; G06F 2203/04806; G06F 2203/04808; G06F 3/0304; G06F 3/04845; G06F 3/04847; G06F 3/04883; G06F 1/022; G06F 9/5072; B60L 50/60; B60L 58/20; B60L 15/007; B60L 15/2054; B60L 2210/10; B60L 50/16; B60L 50/64; B60L 58/21

USPC ....... 716/100–108; 320/106–116; 703/18–21
See application file for complete search history.

(56) References Cited

U.S. PATENT DOCUMENTS

| | | |
|---|---|---|
| 2004/0038087 A1 | 2/2004 | Shiue et al. |
| 2012/0235624 A1* | 9/2012 | Sisk ................. B60L 50/40 320/167 |
| 2015/0165925 A1 | 6/2015 | Lienkamp et al. |
| 2016/0118902 A1 | 4/2016 | Huang et al. |
| 2016/0231387 A1 | 8/2016 | Hodges et al. |
| 2016/0336928 A1* | 11/2016 | Kuznetsov ............... H02J 3/30 |
| 2017/0308623 A1 | 10/2017 | Cox et al. |

OTHER PUBLICATIONS

International Preliminary Report on Patentability from the International Bureau for International Application No. PCT/US2018/067385 mailed Jul. 2, 2020.

Extended European Search Report from the European Patent Office dated Sep. 14, 2021 for European Application No. 18890825.5.

* cited by examiner

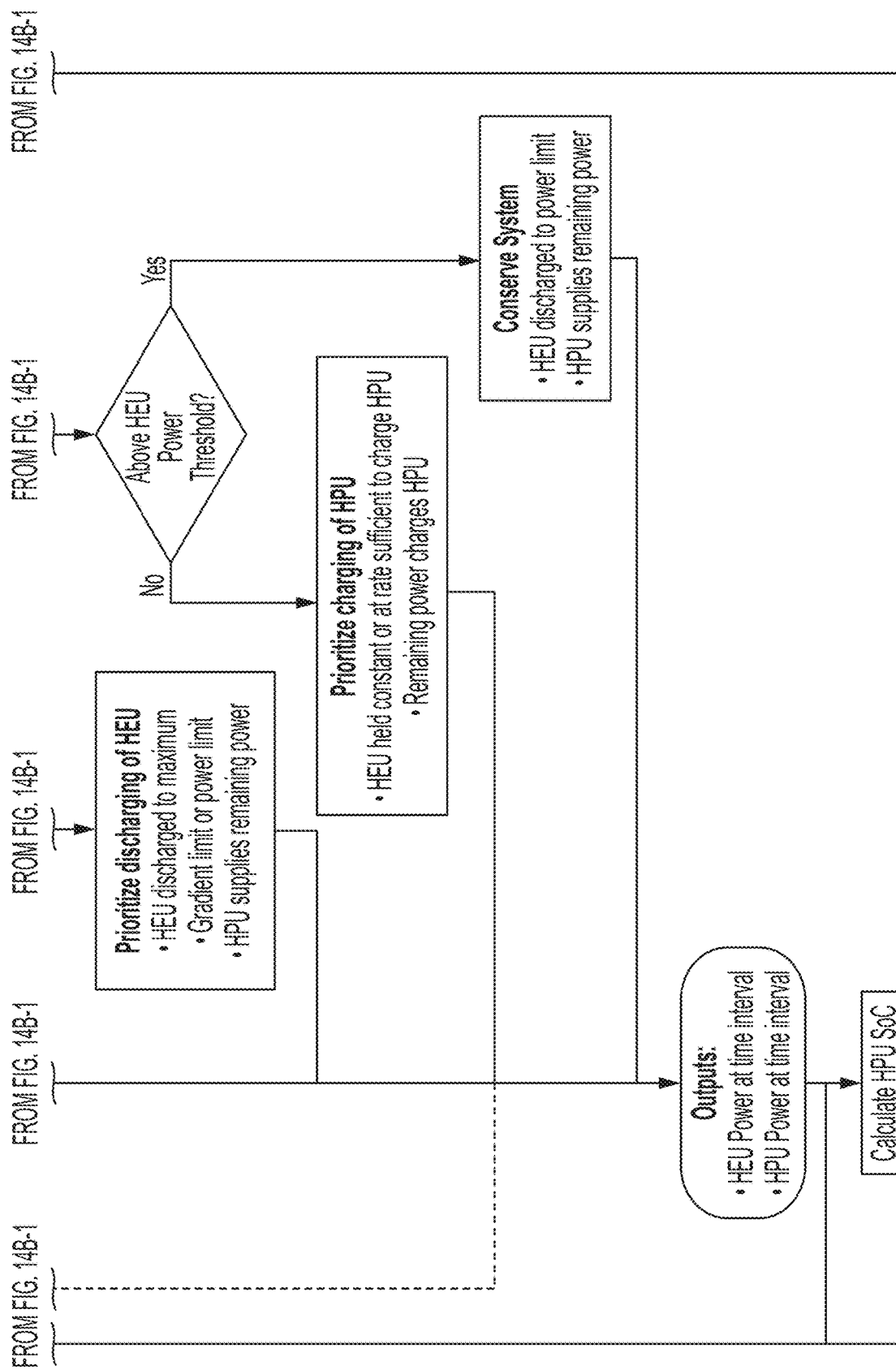

SYSTEM AND METHOD FOR DESIGNING AND CONTROLLING A DUAL ENERGY STORAGE SYSTEM

RELATED APPLICATIONS

This Application is a continuation of U.S. patent application Ser. No. 16/956,543, filed Jun. 19, 2020, entitled "SYSTEM AND METHOD FOR DESIGNING AND CONTROLLING A DUAL ENERGY STORAGE SYSTEM", which is a U.S. national stage filing under 35 U.S.C. 371 of International Patent Application Serial No. PCT/US2018/067385, filed Dec. 21, 2018, entitled "SYSTEM AND METHOD FOR DESIGNING AND CONTROLLING A DUAL ENERGY STORAGE SYSTEM", which claims priority to U.S. Provisional Application 62/609,553, filed Dec. 22, 2017, entitled "CONTROL SYSTEM AND METHOD FOR DUAL CHEMISTRY BATTERY APPLICATIONS," the entire contents of each of which is incorporated by reference herein in its entirety.

BACKGROUND

Electric storage systems, such as battery systems, ultracapacitor systems, and the like, can be optimized for various applications. Some battery storage systems, referred to herein as high energy units or HEU, are configured to store large amounts of energy on a unit mass and/or volume basis. However in order to achieve high energy density, certain aspects, such as the ability to deliver large amounts of power, may be compromised. For example, considerations such as handling excess heat, battery chemistry, electrode configurations, and the like that can be accounted for to achieve high energy density may lead to an HEU configuration that delivers smaller amounts of power over a longer time interval.

Other battery systems, referred to herein as high power units or HPU, are configured to provide large amounts of power over shorter time intervals. Such systems may require considerations of how to handle excess heat, and may have suitable electrode configurations and battery chemistries or utilize entirely different types of electric storage systems (e.g. supercapacitors, ultracapacitors, lithium-capacitors) designed to produce large amounts of power, often over shorter time intervals. A tradeoff is that although an HPU may deliver a large amount of power, the net energy density of the HPU may often be lower, and thus a HPU system may, on an energy per unit mass basis, store less energy than an HEU.

SUMMARY OF THE INVENTION

The inventors have recognized and appreciated that for some applications, instead of trying to produce an energy storage system based on a single battery chemistry intended to handle both HEU and HPU functions on a less than optimum basis, improved systems and methods can be devised. Such an improved system in accordance with some embodiments employs multiple types of energy storage systems (e.g., an HEU-type energy storage system and an HPU-type energy storage system), and manages charging/discharging of the different types of energy storage systems in an intelligent way based on the needs of the application (e.g. such as the power needs of an electric vehicle, the power needed to lift and hover a flying pod, the fluctuation of power in a microgrid).

In some embodiments, systems and methods are provided that model the physics and chemistry of multiple types of energy storage systems (e.g., HEU batteries, HPU batteries, lithium-capacitor solutions, fuel cell systems, flow batteries, and/or ultracapacitor systems). In some embodiments, techniques are provided for controlling and/or designing such heterogeneous energy storage systems, for various applications, such as fully electric or partially-electric (e.g., hybrid) vehicles. Although electric vehicles (e.g. cars, buses, trucks, airplanes, drones, flying pods, warehouse robots, etc.) are often described herein as an example application for the illustrative systems and methods described herein, it should be appreciated that other applications including, but not limited to, electric power grid energy storage (e.g., microgrid) applications, may also be used with the techniques described herein.

Some embodiments are directed to an electrical storage system, comprising a first energy storage system and a second energy storage system, wherein the second energy storage system has a lower electrical energy density and a higher rated electrical power output capability than the first energy storage system, at least one electrical power sensor configured to sense over a plurality of time intervals, electrical power usage information for a load electrically coupled to the first energy storage system and the second energy storage system, and at least one computer processor. The at least one computer processor is programmed to determine based, at least in part, on the sensed electrical power usage information and a power requirement of the load in a current time interval, charging/discharging parameters for each of the first energy storage system and the second energy storage system, and control charging/discharging of each of the first and second energy storage systems in accordance with the determined charging/discharging parameters during the current time interval.

Some embodiments are directed to a method for dynamically providing energy to a load using a first energy storage system and a second energy storage system, wherein the second energy storage system has a lower electrical energy density and a higher rated electrical power output capability than the second energy storage system. The method comprises sensing, over a plurality of time intervals, electrical power usage information for a load electrically coupled to the first energy storage system and the second energy storage system and determining, using at least one computer processor, based, at least in part, on the sensed electrical power usage information and a power requirement of the load in a current time interval, charging/discharging parameters for each of the first energy storage system and the second energy storage system, and controlling charging/discharging of each of the first and second energy storage systems in accordance with the determined charging/discharging parameters during the current time interval.

Some embodiments are directed to a non-transitory computer-readable medium encoded with a plurality of instructions that, when executed by at least one computer processor perform a method. The method comprises determining, based, at least in part, on the electrical power usage information for a load electrical coupled to a first energy storage system and a second energy storage system and sensed over a plurality of time intervals and a power requirement of the load in a current time interval, charging/discharging parameters for each of the first energy storage system and the second energy storage system, and controlling charging/discharging of each of the first and second energy storage systems in accordance with the determined charging/discharging parameters during the current time interval.

Some embodiments are directed to a system, comprising: at least one computer processor, and at least one non-transitory computer-readable medium encoded with instructions that, when executed by the at least one computer processor cause the at least one computer processor to: determine based, at least in part, on sensed electrical power usage information received from at least one electrical power sensor and a power requirement of the load in a current time interval, charging/discharging parameters for each of a first energy storage system and a second energy storage system, wherein the second energy storage system has a lower electrical energy density and higher rated electrical power output capabilities than the first energy storage system, and control charging/discharging of each of the first and second energy storage systems in accordance with the determined charging/discharging parameters during the current time interval.

Some embodiments are directed to a computerized system configured to design an electrical storage system for particular design requirements provided as input to the computerized system. The system comprises at least one computer processor, and a non-transitory computer readable medium encoded with a plurality of instructions that, when executed by the at least one computer processor, perform a method comprising: generating, based on the design requirements and information for a plurality of energy storage systems including a first type of energy storage system and a second type of energy storage system different from the first type of energy storage system, a viable configuration space, determining, for each of multiple pairs of energy storage systems in the plurality of energy storage systems having characteristics that fall within the viable configuration space, a performance measure of the pair, wherein determining the performance measure comprises evaluating a control strategy that dynamically splits power provided and/or stored by the first and second energy storage system in the pair during each of a plurality of time intervals, and providing on a user interface, an indication of the pair of energy storage systems having a highest performance measure.

BRIEF DESCRIPTION OF THE DRAWINGS

FIG. 10 shows an example of a graphical user interface (GUI) used in accordance with some embodiments.

DETAILED DESCRIPTION

Figure 1A:
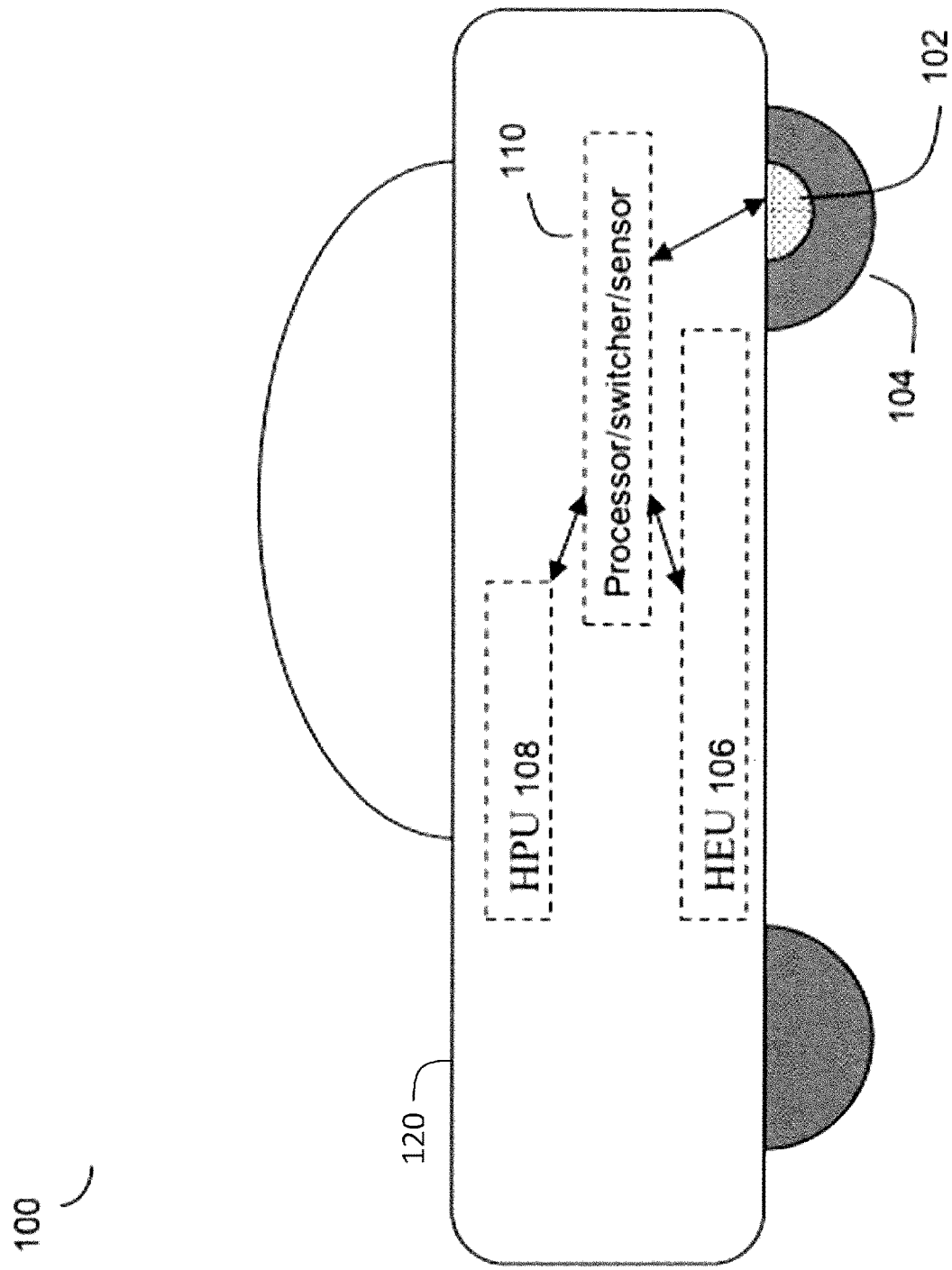
FIG. 1A shows an example of components of an electric vehicle that may be operated in accordance with the techniques disclosed herein.

Some applications, such as electric vehicles, have complex power utilization profiles. An electric car or truck, for example, may need to initially deliver a large amount of power to speed up quickly from a standing start, but then, once an adequate speed has been obtained, may require less power to run, at least when not driving up slopes. The inventors have recognized and appreciated that conventional energy system designs that employ a single battery type may not be ideal for such applications. To this end, some embodiments are directed to a multiple energy storage system configuration in which power is provided to an electrical load (e.g., an electrical vehicle) from one or more of the multiple energy storage systems at each of a plurality of time intervals in accordance with a control technique that takes into consideration energy utilization during at least one previous time interval and a power requirement of the load during a current time interval.

In some embodiments, a first energy-dense storage unit, hereafter referred to as High Energy Unit (HEU) is combined with a second power-dense storage unit, hereafter referred to as High Power Unit (HPU), as separate components in a modularized energy storage system. The HEU and HPU may then be controlled independently to leverage performance benefits of each component (e.g., each HEU and HPU) throughout an application load cycle.

For instance, the inventors have recognized and appreciated that rapid ramp-up (e.g., a large increase of a rate of discharge in a small amount of time) may negatively impact a state of health of an even if the ramp-up is well within the HEU's rated discharging limit. Therefore, in some embodiments, a control technique may limit an HEU's ramp-up based on a selected threshold gradient, and may use an HPU to supply remaining power demand from an application. In some embodiments, the threshold gradient may be determined based on simulation data, for instance, to improve the HEU's lifetime.

In various embodiments, an HEU may be an energy cell, an energy module, an energy pack, etc., and likewise for an HPU.

Some embodiments include one or more computer processors programmed with computer-executable instructions that when executed by the computer processor(s) leverage complementary attributes (e.g., high energy storage vs. high power output) of energy storage systems employing both HEU and HPU units. The improved energy management methods may enable combination HEU and HPU systems to obtain significantly cheaper, lighter, higher specific-power (kW/kg-battery) and/or longer lifetime (life-cycles) performance, compared to conventional single-chemistry storage systems.

In some embodiments, computer-implemented systems are provided that are configured to optimize selection of components for and control of a dual-energy storage system for applications with given power requirements. For example, the optimization may be achieved using simulations to maximize energy storage efficiency and/or lifetime performance of the energy storage systems.

In some embodiments, at least one computer processor is programmed to assess a large number (e.g., millions) of potential power utilization combinations, according to one or more user-specified performance criteria. This technique (which may be implemented using software and/or dedicated hardware), is referred to herein as the "Smart Control Algorithm for Dual-energy Applications" or "SCADA."

As will be discussed in further detail below, some embodiments attempt to optimize the overall performance of a multiple energy storage system (e.g., a storage system that includes HEU and HIV components) by intelligently distributing electrical power between the storage system's HEU and HPU components according to power needs and the underlying physics and chemistry of the HEU and HPU systems. The control techniques may consider any suitable combination of one or more aspects, such as the total electrical power load profile (e.g. application power needs as a function of time), and models of the physics and chemistry of the various HEU and HPU systems. For instance, a model may be used in a simulation run to predict a state of health of an HEU or an HPU after a certain number of charging/discharging cycles under certain conditions. In some embodiments the control techniques are programmed to ensure that HEU and HPU systems are operated within certain preset ratings (e.g., nominal ratings).

FIG. 1A shows an example of an electric vehicle application that includes one or more electrical loads that may be powered using an electrical storage system in accordance with some embodiments. In the example shown in FIG. 1A, the electrical vehicle is an electric car 100, though it should be appreciated that other types of electric vehicles (or any other type of electrical load that may utilize power generated from one or more electrical storage systems such as batteries may be used additionally or alternatively. The electric vehicle 100 has wheels 104 and at least one motor/generator 102 configured to apply torque to at least one wheel 104 in response to electrical power provided by electrical storage system 120. Under certain conditions (e.g., breaking), motor/generator 102 may generate energy that may be provided to the electrical storage system 120 for storage (e.g., to charge one or more components of the electrical storage system). In this example, the electrical storage system 120 includes at least one HEU 106 and at least one HPU 108. Charging/discharging of energy by the electrical storage system 120 may be controlled by at least one computer processor 110, suitable high power switching circuitry, and/or electrical power sensors, as discussed in more detail below. Although the at least one computer processor 110 is illustrated in FIG. 1A as a component of electrical storage system 120, it should be appreciated that in some embodiments at least one computer processor 110 may be separate from, but in communication with, electrical storage system 120. Electrical power sensors and switching circuitry may be configured to monitor and control the flow of electrical power to and from any of the HEU 106 HPU 108, and electrical motor/generator 102.

Figure 1B:
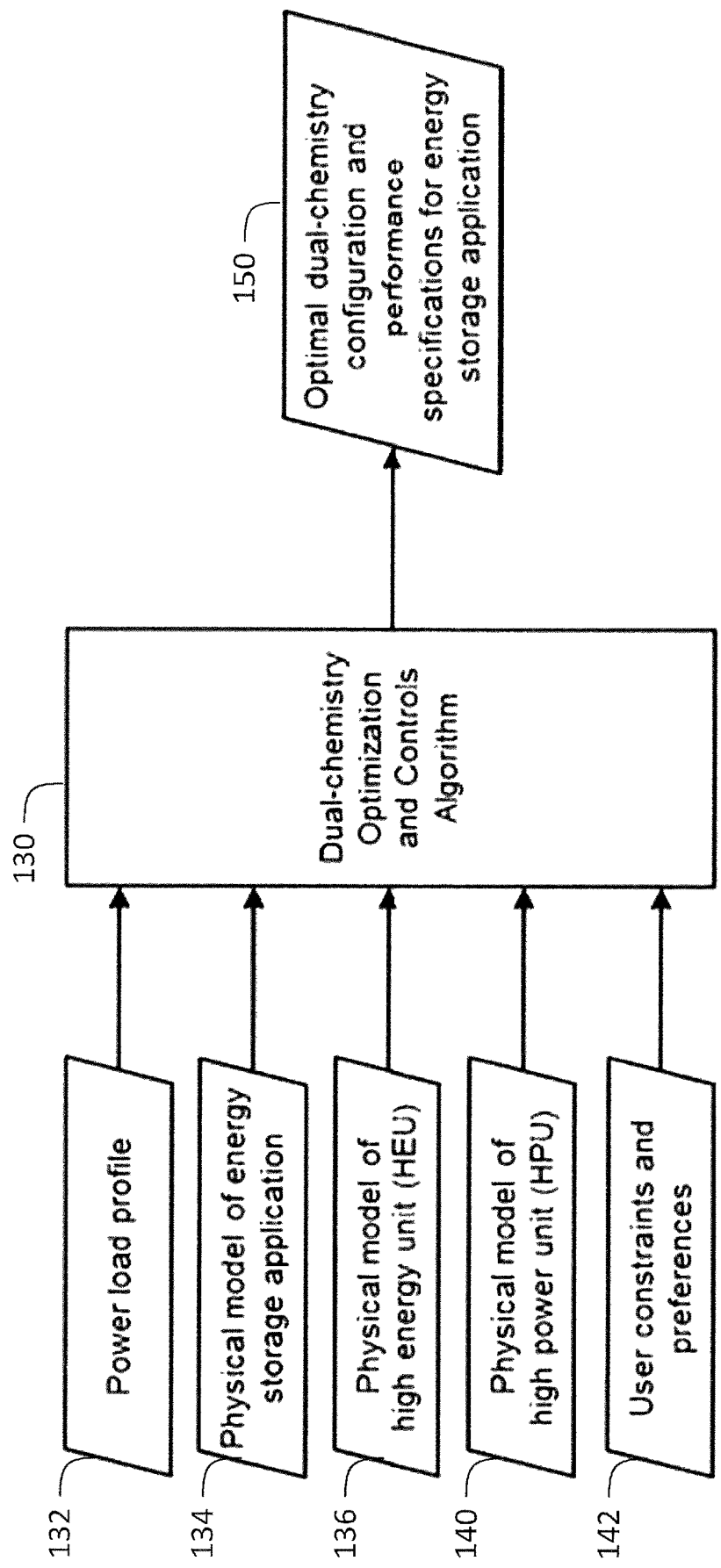
FIG. 1B shows an overview of some inputs and outputs of a design and control technique in accordance with some embodiments.

As shown FIG. 1B, some embodiments relate to a dual-energy design and control technique 130 that may be implemented using one or more computer processors. In some embodiments, technique 130 may be configured to provide one or more recommended configurations for dual-energy system design for a particular application (e.g., before an electrical storage system is selected for use in powering an electrical load). In other embodiments, technique 130 may be used during operation of a particular application (e.g., an electric vehicle) to assess power usage and power requirements of an electrical storage system. When used during operation of an application, the technique may be used to provide control (e.g., charging/discharging) of energy storage systems to, for example, improve system cost and lifetime performance of individual and combined energy storage systems in the electrical storage system.

In some embodiments, technique 130 receives one or more inputs, examples of which include, but are not limited to, a power load profile 132, a physical model of the energy storage application (e.g., electrical vehicle) 134, a physical model of an HEU 136, a physical model of the HPU 140, and user constraints and preferences 142. An output of technique 130 may include a recommendation (if technique 130 is used for energy storage design) and/or one or more control parameters (if technique 130 is used for performance tuning during operation), for a dual-energy configuration and performance specification for an energy storage application 151).

In some embodiments, power load profile 132 may be a profile of a time-resolved power (e.g., power as a function of time) received from or consumed by the particular energy storage application. For example, if the application is an electric vehicle, the power load profile 132 may be determined based, at least in part, on records of typical power utilization scenarios for the electric car. The records of typical power utilization scenarios may be used in any suitable way to determine the power load profile. For example, an average of the utilization scenarios may be used as a default time-resolved power profile. More complex schemes are also possible. For instance, considering an electric car application, if the car identifies that a driver with a history of demanding high acceleration is driving the car, a first power load profile for the driver (or similar drivers) may be provided as input to technique 130, rather than another driver with a history of more conservative driving associated with a second power load profile.

The physical model of the energy storage application 134 may include, for example, information related to the energy storage housing. The physical model of the HEU 136 may include, for example, HEU characteristics such as a rated charge and discharge power, a rated capacity, cost, weight, operating states of charge, operating temperatures of the HEU, etc. Other factors, such as a thermal profile of the HEU, outside ambient temperature, temperature of the HEU as reported by one or more temperature sensors, may also be used in some embodiments to improve the accuracy of the physical model 134. The operating lifetime of the HEU may also be employed to model the effects that extensive use of the HEU may have had on the physical characteristics of the HEU.

The physical model of the HPU 140 may include HPU characteristics including, but not limited to, a rated charge and discharge power, a rated capacity, cost, weight, operating states of charge, operating temperatures, etc. Other characteristics, such as the thermal profile of the HPU, outside ambient temperature, and temperature of the HPU as reported by one or more temperature sensors, may also be used in some embodiments to improve the accuracy of the physical model 136. The operating lifetime of the HPU may also be employed to model the effects that extensive use of the HPU may have had on the physical characteristics of the HPU.

User-specified or other criteria 142 including, but not limited to, constraints and preferences for storage system cost (e.g., price paid for electrical power), power, capacity and other performance specifications may be provided as input to technique 130.

Figure 2:
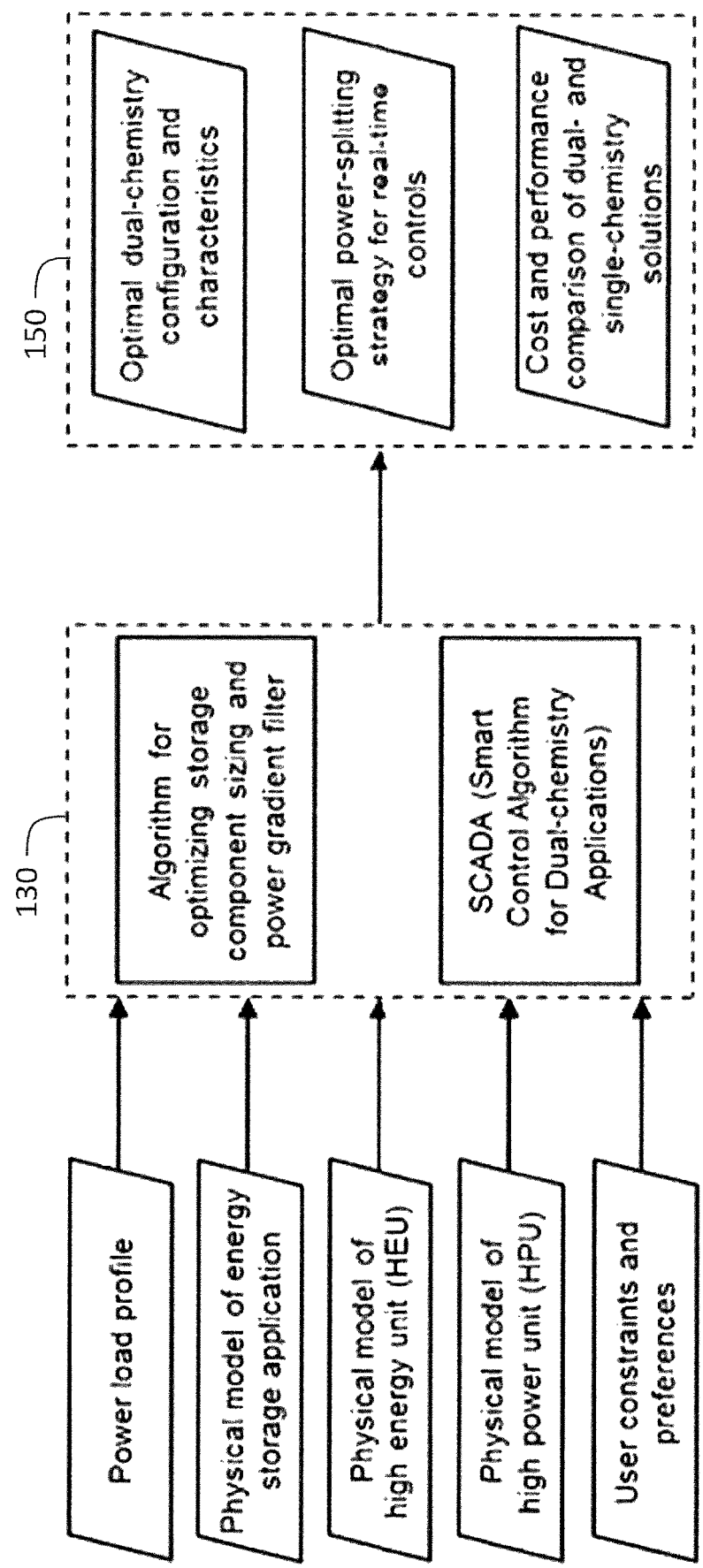
FIG. 2 shows how information flows into and out of a smart control technique for dual-energy applications designed in accordance with some embodiments.

FIG. 2 further illustrates aspects of a dual-energy design and control technique that may be used to select and/or control components of an electrical storage system in accordance with some embodiments. As shown, technique 130 may include multiple techniques including, but not limited to, a technique for improving storage component sizing, a power gradient, and a "Smart Control Algorithm for Dual-energy Applications" (SCADA). In some embodiments, at least a portion of technique 130 is implemented using one or more of "if-then" type logic and table lookup techniques. An example implementation of SCADA is discussed in more detail below with regard to FIG. 6B.

As shown in FIG. 2, technique 130 may be configured to output one or multiple types of information including, but not limited to, a dual-energy storage configuration and one or more associated characteristics (e.g., when technique 130 is used to simulate energy storage system configurations), a recommended power splitting strategy for real-time control of multiple energy storage systems (e.g., when technique 130 is used to tune performance of an electrical storage system during operation of an electrical load such as an electric vehicle), and/or a cost and performance comparison of dual- and single-energy system solutions.

In one implementation, for each combination of inputs, the SCADA technique is implemented by, for example, optimizing a power splitting controls strategy (e.g., controlling the power splits between the HEU and HPU) based on one or more factors, such as a choice of threshold gradient for HEU charging and/or discharging. Examples of such factors are discussed in more detail below. The SCADA technique may be designed to select for the best performing HEU/HPU power split combinations based on various HEU and HPU performance specifications including, but not limited to, HEU and HPU power, capacity, and unit peak power.

Figure 3:
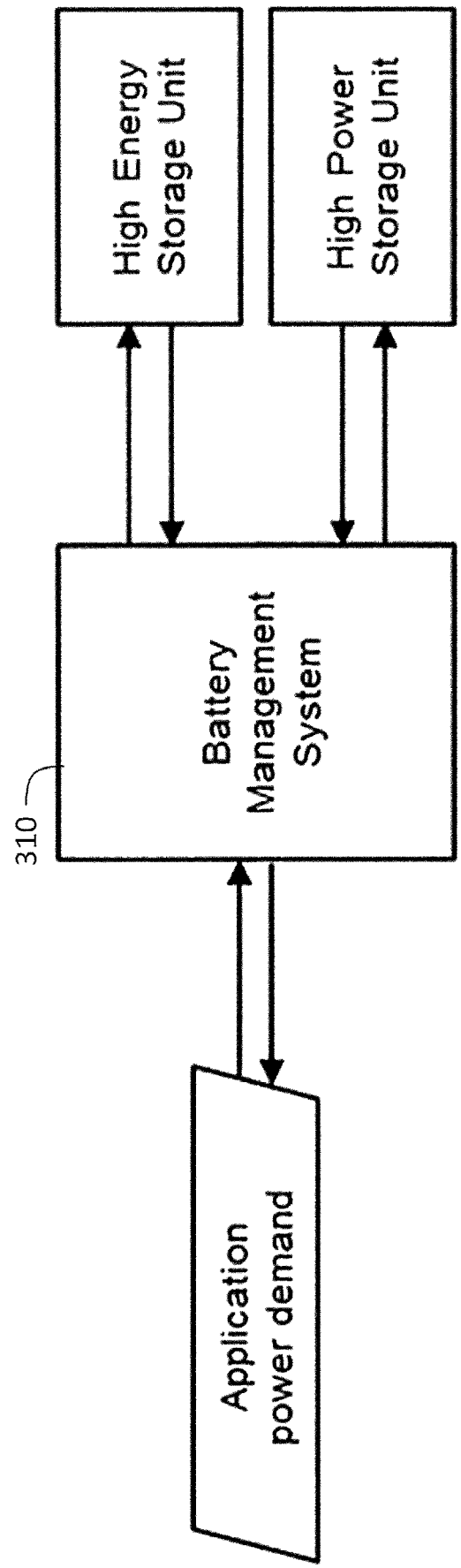
FIG. 3 shows an example of electrical power flow between an electrical load and multiple energy storage systems using a battery management system in accordance with some embodiments.

FIG. 3 schematically illustrates a power flow between the energy storage systems HEU and/or HPU) and the power requirements (demand or supply) of an electrical application. The electrical storage system may include a battery management system 310 configured to control charging/discharging of the energy storage systems based, at least in part, on current power requirements of an electrical load, in some embodiments, battery management system 130 includes a component configured to control multiple energy storage systems (e.g., HEU and HPU). In other embodiments, battery management system 130 includes multiple components (e.g., at least one slave battery management system, a master battery management system (e.g., a vehicle control unit), and at least one processor) configured to communicate with each other to coordinate control of multiple energy storage systems.

In some embodiments, battery management system 310 may have included therein, a control technique 130 for determining how and when to charge/discharge the energy storage systems. For example, the battery management system 310 may include one or more computer processors programmed to implement one or more of the techniques described herein for controlling utilization of multiple energy storage systems. The one or more computer processors may be programmed to continually or periodically evaluate the state of charge of the HEU and/or HPU, and other variables such as trends in system power demand and instantaneous power demand, and dynamically adjust the energy utilization control strategy accordingly.

In some embodiments, application power demand may be divided into multiple time intervals, with current power requirements of the application assessed within each of the multiple time intervals. During time intervals of power demand from the application, the battery management system 310 may be configured to procure power from the energy storage units (e.g., HEU and/or HPU) in a manner that prolongs lifetime, or according to any other suitable energy storage goal. During time intervals in which power is recovered from the application (e.g. through regenerative braking for vehicle applications and other energy recovery techniques), the battery management system 310 may be configured to charge one or multiple of the energy storage systems (e.g., One or both of the HEU and HPU).

In some embodiments, the high energy storage (HEU) and high power storage (HPU) units are not directly connected to each other so that each of the energy storage units is charged and/or discharged at their respective rated voltages. In such implementations, the electrical storage system may incorporate one or more switches (e.g., high power solid state switches) and/or other computer processor-controlled power regulation devices to allow independent control over energy provided to and sourced from the HEU and HPU energy storage systems.

Figure 4:
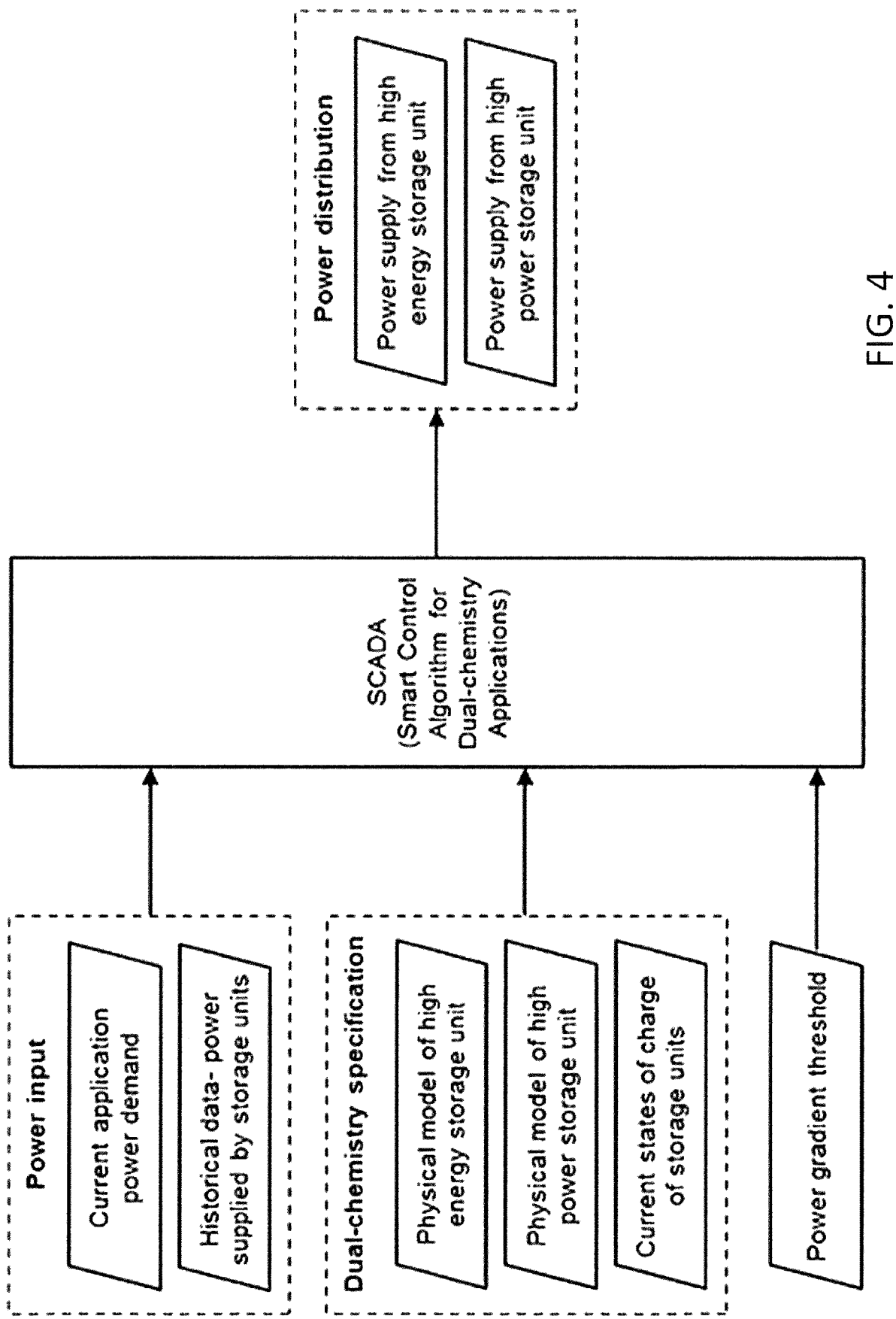
FIG. 4 shows a diagram of inputs and outputs for a control technique used in accordance with some embodiments.

FIG. 4 illustrates an example implementation of a technique for controlling power distribution in an electrical system in accordance with some embodiments. In the example shown in FIG. 4, power distribution to and from HEU and HPU energy storage systems is determined based, at least in part, on a plurality of inputs including:

Power input—an instantaneous and/or historical load profile (e.g., a time-resolved power received from or consumed by the electrical load) may be retrieved from memory, and/or generated by one or more computer processors according to data stored in memory and other information, such as type of application, time of day, temperature, user profiles, and the like.

Dual-energy specification—physical models (e.g., techniques that realistically describe the physics of the HEU and HPU) of both the high energy unit and high power unit may be retrieved from memory and/or generated by one or more processors. These physical models may include, but are not limited to, the HEU and HPU rated charge and discharge power, battery chemistry, rated capacity, cost, weight, operating states of charge and operating temperatures. The dual-energy specification may also include the present states of charge of both the HEU and HPU, which may be obtained, for example, using electrical sensors (e.g., sensors to monitor energy system voltage, current, and the like).

Power gradient threshold—a threshold gradient (e.g., in watts per second W/s or kilowatts per second kW/s) which allows for HPU charging or discharging based on the load profile; this feature ensures that instances of high power demand and ramp-up are primarily borne by the HPU, which is configured to deliver higher levels of electrical power.

In some embodiments, the following scenarios are considered regarding the distribution of power to or from the HEU and HPU:

(A) The application requires power:

(A1) If condition (A) is satisfied and the power requirement of the application is increasing, then the HEU can be configured to supply power up to the maximum rated power of the HEU, subject to the criteria that the HEU threshold gradient not be exceeded. The HPU will supply the remaining power not provided by the HEU.

(A2) If condition (A) is satisfied and the power requirement of the application is not increasing, then the HEU can be configured to maintain its power supply from the previous time interval, provided that the supplemental power supplied to, or by, the HPU does not violate state of charge limitations of the HPU within that time interval. The difference between the total power demand at the present time interval and the power supplied by the HEU in the previous time interval, which may be negative or positive, is accounted for by charging or discharging the HPU such that the sum of the power of the HEU and the power of the HPU equals the total power demand of the application at that time interval.

(A3) If condition (A) is satisfied and the power requirement of the application is not increasing, but maintaining the previous power supply of the HEU would exceed state of charge limitations of the HPU, the charging or discharging of the HPU can be limited so as to reach the minimum allowable state of charge (for HPU discharging) or maximum allowable state of charge (for HPU charging) within the current time interval.

(B) If condition (A) is not satisfied (i.e., the application does not require power) and excess power is produced by the application (e.g., through regenerative braking or other energy recovery mechanisms), the recovered power may be distributed such that HPU charging is prioritized over HEU charging.

Figure 5:
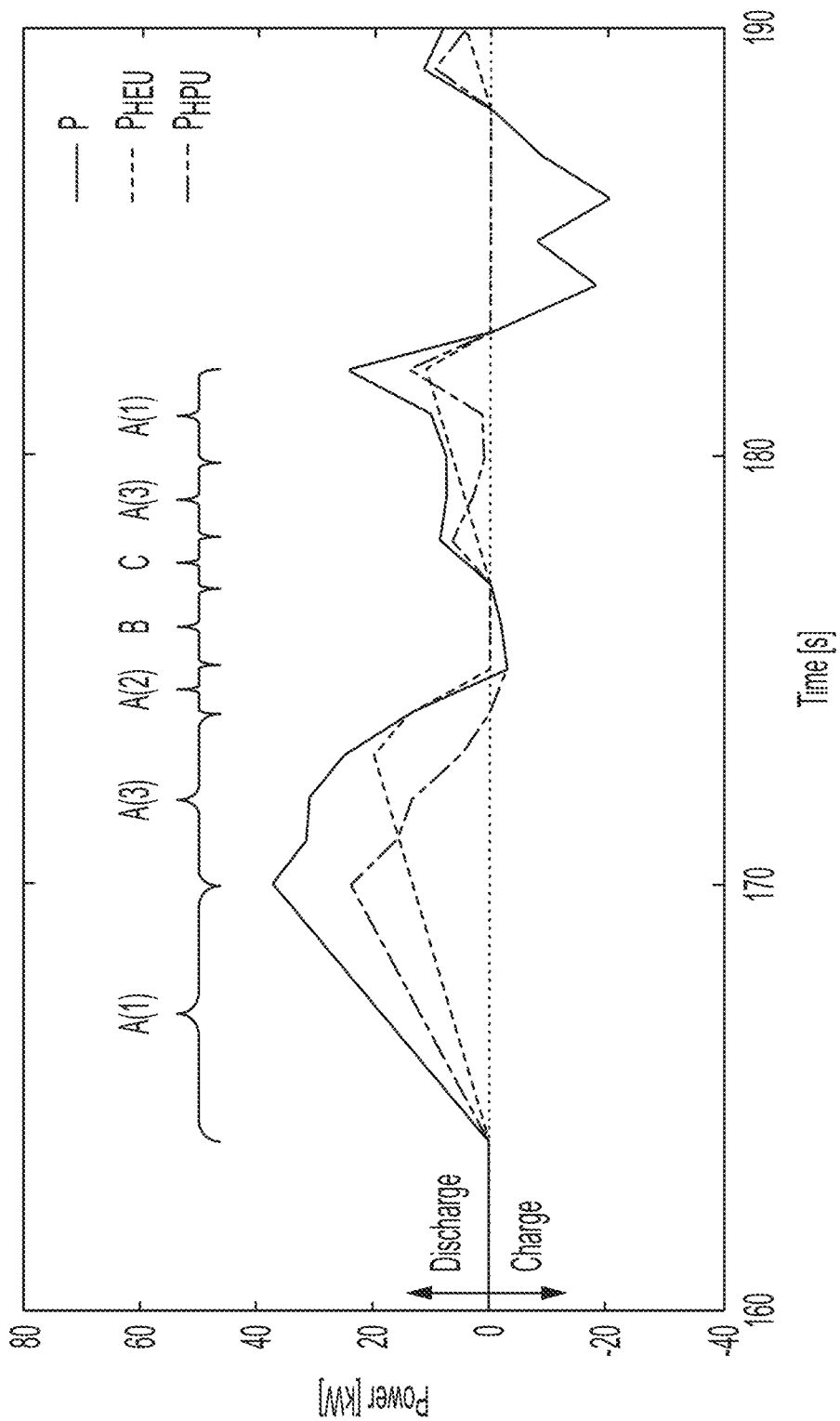
FIG. 5 schematically illustrates an implementation of a control technique over a of time intervals for power management in accordance with some embodiments.
Figure 6A:
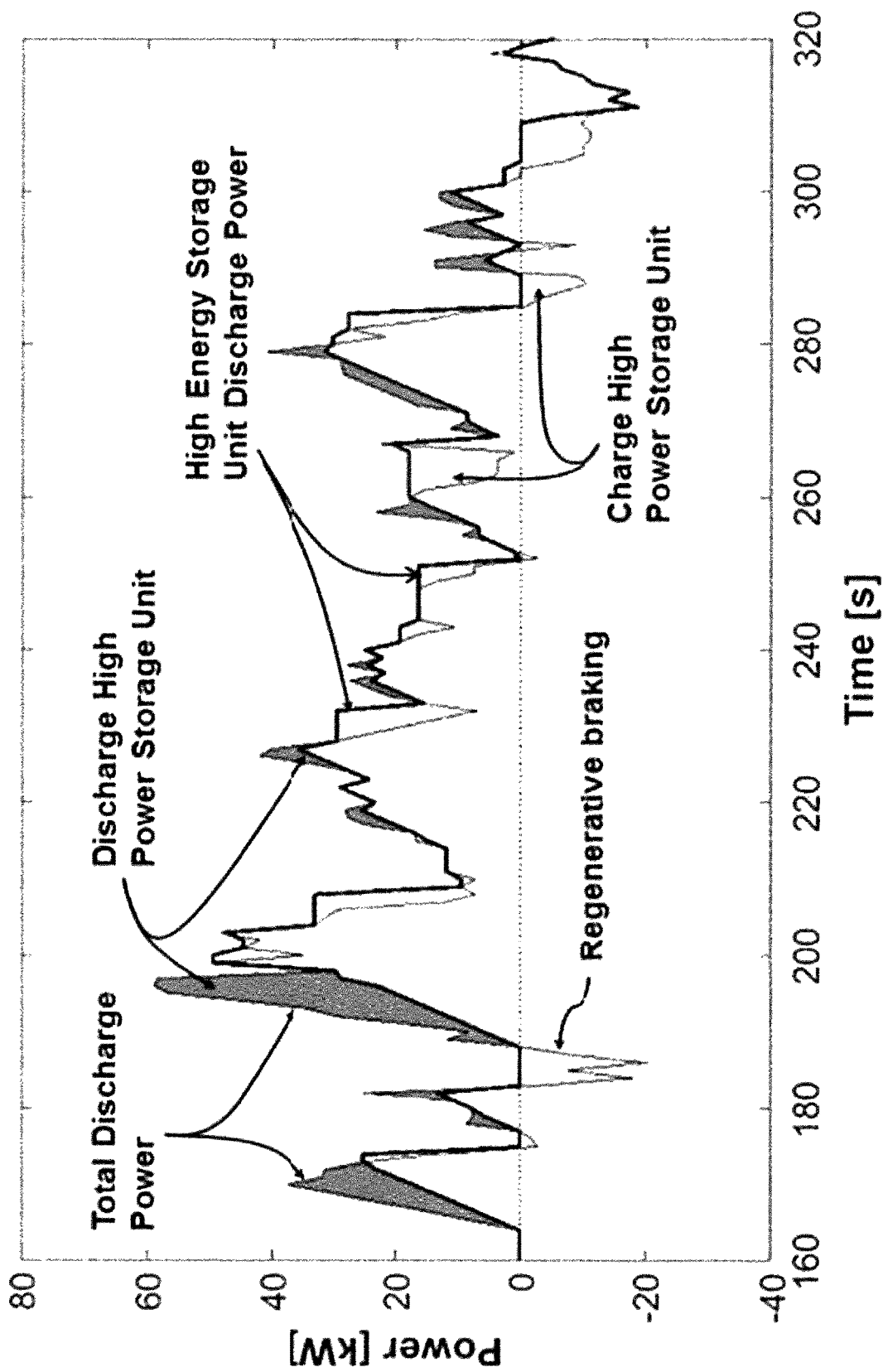
FIG. 6A schematically illustrates an implementation of a control technique over a plurality of time intervals for power management in accordance with some embodiments.
Figure 6B:
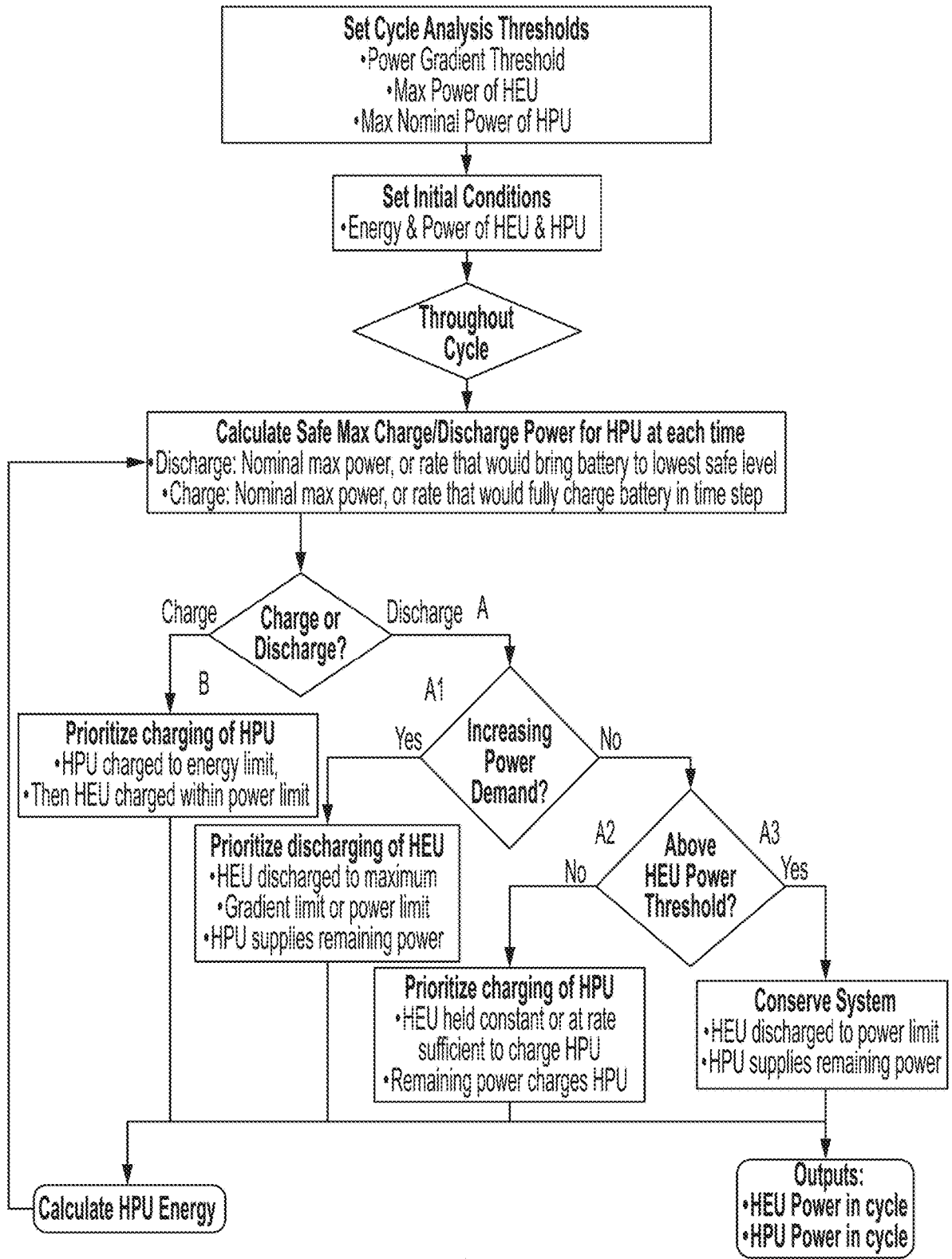
FIG. 6B shows a flowchart of decisions made in a control technique in accordance with some embodiments.

Illustrative methods by which a control technique designed in accordance with or more of the techniques described herein determines power distribution to or from the HEU and HPU based on the provided inputs are discussed in more detail with regard to FIG. 6B, FIG. 5 illustrates an illustrative electric vehicle driving cycle in which the scenarios outlined above are identified with labels. As shown, positive power indicates power dispatched by the HEU and/or HPU to power the electric vehicle, and negative power indicates power received by the HEU and/or HPU from the electric vehicle (e.g., due to regenerative braking).

As shown n FIG. 5, when the electric vehicle initially starts up and power demands are high (situation A1), both the HEU and HPU are configured to supply power to the motors. By contrast, when the vehicle, is at speed (situation B), the system is configured to use any recovered power (e.g., by regenerative braking) to prioritize charging the HPU units over charging the HEU units.

Some embodiments may be implemented as a family of related power management techniques, such as techniques of the type discussed below:

As previously discussed, some embodiments intelligently dispatch and/or distribute power between the HEU and HPU. In addition to the previously discussed inputs, other inputs may include:

1. Nominal power rating of the HEU: ($P_{HEUnom}$) and nominal power rating of HPU: ($P_{HPUnom}$). Alternatively this may be expressed in subscript nomenclature, such as $P_{HEU,nom}$
2. Rated capacity of the HPU: ($E_{HPUnom}$)
3. Maximum HPU power discharged based on the HPU's minimum operating state of charge ($P_{HPUmaxdischarge}$)
4. Maximum HPU power charged based on the HPU's maximum operating state of charge ($P_{HPUmaxcharge}$)
5. Maximum HEU power discharged based on the HEU's minimum operating state of charge ($P_{HEUmaxdischarge}$)
6. Maximum HEU power charged based on the HEU's maximum operating state of charge ($P_{HEUmaxcharge}$)
7. Total application power demand at current time (P(t)) and previous time-instant (P(t−1))
8. instantaneous power ramp up: (dP(t))
9. History of HEU power dispatched at time t−1: $P_{HEU}(t-1)$) and time t−2: ($P_{HEU}(t-2)$)
10. Current state of charge of the HPU: (HPUSOC)
11. Present threshold power ramp rate (dPthreshold) (also referred to herein as "threshold gradient")

The power dispatched or received by the HEU at any instant is denoted as $P_{HEU}$, with $P_{HEU}>0$ indicating power dispatch and $P_{HEU}>0$ indicating power received through regenerative braking or other energy recovery mechanisms.

The power dispatched or received by the HPU at any instant is denoted as $P_{HPU}$, with $P_{HPU}>0$ indicating power dispatch and $P_{HEU}>0$ indicating power received either from the HEU or through regenerative braking or other energy recovery mechanisms.

In addition to the nominal power ratings of the HEU and HPU units, some embodiments also consider the power dispatch and/or distribution between the HEU and HPU, in addition to the ramp-up and/or ramp-down rate of application power.

In some embodiments, even if the total power demand from the application is within the nominal power rating of the HEU, the energy storage systems may be configured so that instances of high power ramp-up are borne, at least primarily, by the HPU. Keeping the discharge level of the HEU within a relatively constant range may help prolong the lifetime of the HEU. However, the inventors have recognized and appreciated that relying on the HPU for high power ramp-up may lead to rapid HPU depletion.

Accordingly, in some embodiments, to keep the HPU from being depleted, the electrical storage system may be configured such that the HPU is recharged by the HEU during instances of total power ramp-down, and/or during instances of regenerative braking or through other energy recovery mechanisms. Prioritizing charging of the HPU in these scenarios may provide both steady discharge of the HEU and continued availability of HPU during future instances of high power ramp-up, when use of the HPU is more efficient. These techniques may significantly enhance the lifetime-performance of the energy storage systems.

As previously discussed in connection with FIG. 5, some embodiments consider the following scenarios to dispatch or distribute power between the HEU and HPU:

(A) if the application (e.g., the electric vehicle or other power-using application) demands power at a current time interval (P(t)>0), then (A1) If the total system power is increasing P(t)−P(t−1)>0 or total system power exceeds the maximum HEU power supply to satisfy the nominal power limit P(t)>max ($P_{HEUnom}$), and the HEU supplied all power at the previous time interval, then the HEU provides power up to its nominal rating $P_{HEUnom}$ or its threshold gradient, while the HPU supplies the remaining required power:

That is:

$P_{HEU}(t)=\min(P_{HEUnom},P(t),P_{HEU}(t-1)+dP_{threshold})$  1.

$P_{HPU}(t)=\min(P(t)-P_{HEU}(t),P_{HPUmaxdischarge(t)})$  2.

In some embodiments, whether or not power was demanded during a previous time interval and/or the state of charge limits of the HPU are also taken into consideration.

For instance, if during the previous time interval the system did not demand power or was supplied power (e.g., through regenerative braking) P(t−1)<=0):

1. Discharge the HEU to follow the HEU threshold gradient or supply the entire power demand if the increase in power demand is less than the threshold gradient increase, or in the case that following the threshold gradient would exceed the state of charge limits of the HPU, discharge the HEU such that the HPU is kept within its operating state of charge during the current time interval.

$P_{HEU}(t)=\max(\min(P(t),dP_{threshold}*(\Delta t)),P(t)-\max(P_{HPU,discharge}(t)))$ 2. Unless the HEU supplied the total power demanded by the application at the previous interval, discharge the HPU to supply the remaining power demand $P_{HPU}(t)=P(t)-P_{HEU}(t)$ If the application demanded power at a previous time interval (P(t−1)>0), the HEU may be discharged to supply the least power demand amongst the following, while accounting for the HPU state of charge limits:

1. Increase HEU power by the threshold gradient
2. Supply the entire power demand
3. Supply maximum HEU power within nominal system limits such that the supplemental HPU power requirements would not exceed its state of charge limits $P_{HEU}(t)=\max(A,P(t)-\max(P_{HPU,discharge}(t)))$, such that $A=\min(P_{HEU}(t-1)+dP_{threshold}*(\Delta t),P(t),\max(P_{HEU,discharge}(t)))$ (A2) If condition (A1) is not satisfied, P(t)<$P_{HEUnom}$ and $P_{HEU}(t-1)$>=P(t−1) then the HEU may supply excess power to charge the HPU That is:

$P_{HEU}(t)=\min(P_{HEU}(t-1),P_{HEU}(t-1)+P_{HPUmaxcharge}(t))$  1.

$P_{HPU}(t)=P(t)-P_{HEU}(t)$  2.

It should be noted that $P_{HPUmaxcharge}$ may be a negative number.

In some embodiments, whether or not the HEU supplied all of the power to the application at the previous time interval is taken into consideration. For instance, if the HEU supplied all power at the previous time interval P(t−1)=$P_{HEU}$(t−1).

1. If the HPU is not fully charged or cannot be fully charged within the current time interval, maintain HEU discharge from the previous time interval and use excess power to charge the HPU, otherwise decrease HEU power such that the excess power fully charges the HPU in the current time interval $P_{HEU}(t)=\max(P_{HEU}(t-1),P(t)-\max(P_{HPU,discharge}(t)))$ 2. Charge the HPU $P_{HPU}(t)=P(t)-P_{HEU}(t)$ If the HEU did not supply all of the power to the application at the previous time interval:

Maintain the rate of change in HEU power demand (increasing, constant, or decreasing) or, in the case that the supplemental power requirements would exceed the discharge limits of either the HEU or the HPU, discharge the HEU such that the Hal and the HPU are kept within their respective operating state of charge and nominal power limits during the current time interval $P_{HEU}(t)=\max(B,P(t),\max(P_{HPU,discharge}(t)))$ $B=\min(P_{HEU}(t-1)-P_{HEU}(t-2)*(\Delta t)+P_{HEU}(t-1),P(t),\max(P_{HEU,discharge}(t)))$  1.

2. Charge the HPU $P_{HPU}(t)=P(t)-P_{HEU}(t)$ (A3) If conditions (A1) and (A2) are not satisfied, then the Hal continues to ramp up at existing rate and the HPU supplies the remaining required power That is:

$P_{HEU}(t)=\min(2P_{HEU}(t-1)-P_{HEU}(t-2),P(t),P_{HEUnom})$  1.

$P_{HPU}(t)=\min(P(t)-P_{HEU}(t),P_{HPUmaxdischarge}(t))$  2.

(B) If condition (A) is not satisfied and power is received by the application through regenerative braking or other energy recovery mechanisms, P(t)<0

1. Prioritize charging the HPU within the HPU charge limitations (electrochemical and state of charge)

$P_{HPU}(t)=\max(P(t),\max(P_{HPU,charge}(t)))$

2. If HPU cannot accept full charge supplied through regenerative elements, charge HEU $P_{HEU}(t)=P(t)-P_{HPU}(t)$ FIG. 6A shows an example of how a control technique for controlling charging/discharging of energy storage systems in accordance with some embodiments may be implemented to provide power to an electric vehicle driving in an urban environment. The dark grey shaded areas in FIG. 6A represent time intervals in which the HPU of the vehicle is being discharged to provide power for the load profile. The light grey shaded areas in FIG. 6A represent time intervals in which the HPU is being charged, either through regenerative braking and other application-specific energy recovery mechanisms (condition B above) or through discharge of the HEU (condition A2 above).

As discussed briefly above, some embodiments employ a "treshold gradient" to help ensure that the charging and discharging of the HEU is limited during time intervals of high power ramp-down or ramp-up, respectively. The inventors have recognized and appreciated that using a threshold gradient may significantly reduce fluctuations in the HEU load profile, which may in turn benefit the lifetime performance and longevity of the associated HEU system. The threshold gradient for the HEU may be fixed or set dynamically. In some embodiments, the threshold gradient may be set dynamically based on characteristics of the HEU, such as a measure of the current health of the battery. Other factors may also be used to dynamically set the threshold gradient, and aspects of the technology described herein are not limited in this regard.

FIG. 6B shows a flowchart of a computer-processor implemented control technique in accordance with some embodiments. The conditions A, A1, A2, A3, and B described above are shown as labels on the flowchart of FIG. 6B.

During use, each of the HEU and HPU may experience a series of charge and discharge cycles. In some embodiments, discharging of the HPU is controlled so that the HPU is not discharged beyond a lowest safe level, and the HPU is charged at a rate so as to become fully charged within a certain time interval of interest (e.g., 1 Hz, 50 Hz, etc.). Thus, during times of discharge (i.e., when power is required by the load), it is determined whether the power demand of the electrical load is increasing or decreasing based, at least in part, on a comparison of the power requirement during current time interval and at least one previous time interval. If it is determined that the power demand is increasing, discharging of the HEU is prioritized, while the HPU supplies the remaining power (condition A1). If the power demand is not increasing (condition A2), and the power demand is not above the HEU power threshold, then the system prioritizes charging the HPU and holds the HEU discharge constant (or within a small range) and uses any remaining power to charge the HPU, if the power demand is not increasing (condition A2) and is above the HEU power threshold (condition A3), then the system discharges the HEU to its power limit and the HPU is used to supply remaining required power to the load.

When the system is receiving energy (e.g., from regenerative braking or the like—condition B) charging the HPU may be prioritized until it reaches its energy limit, and then the HEU may be charged within the limits of available power returned by the system.

Figure 7A:
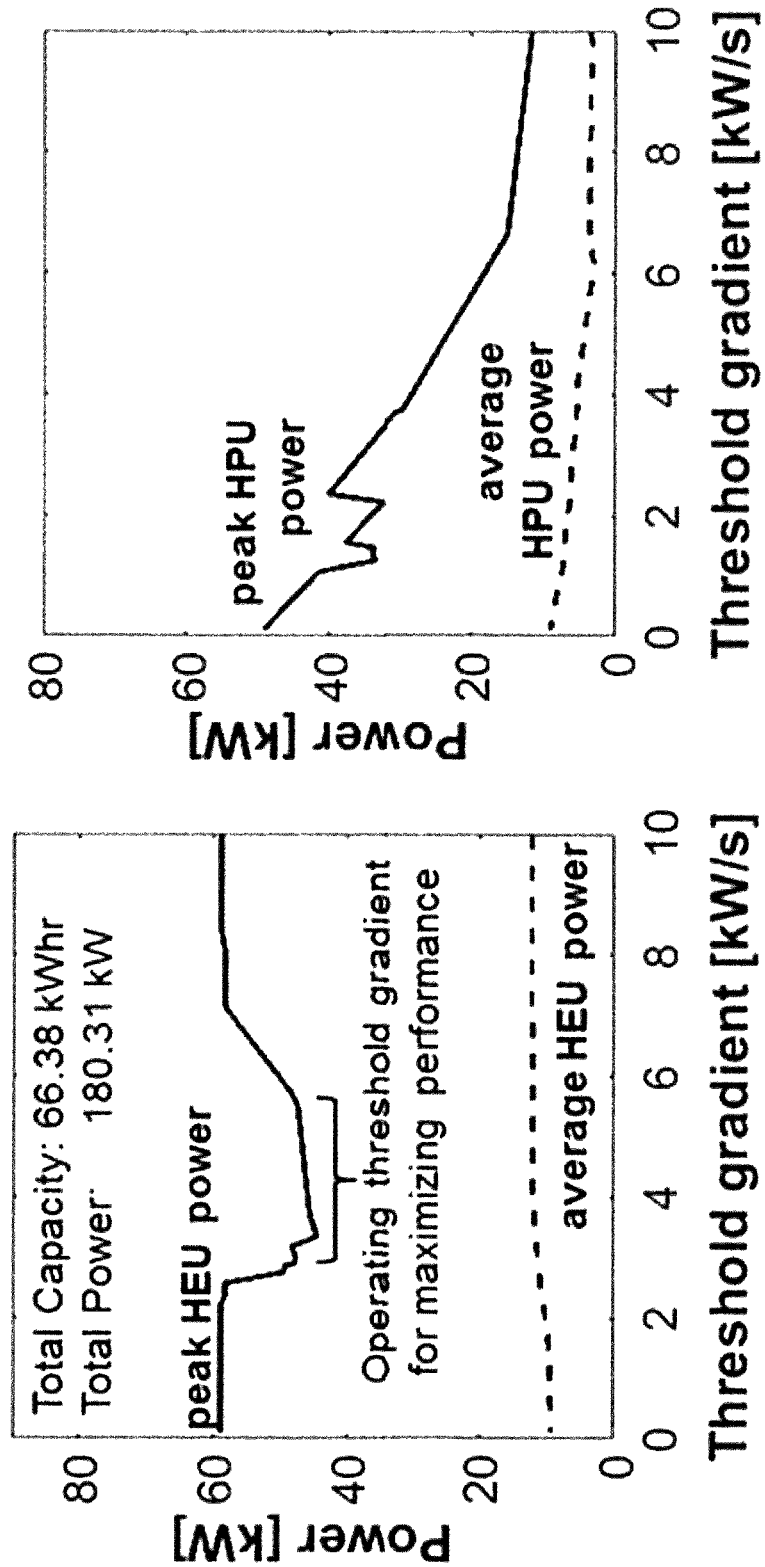
FIG. 7A shows details of a control threshold gradient in accordance with some embodiments.

FIG. 7A shows plots to further describe the concept of a "threshold gradient" for use with some embodiments. For instance consider the performance of an electric vehicle employing a dual (HEU-HPU)-energy storage system during an illustrative urban driving cycle. If the power-demand of the vehicle increases at a rate higher than the "threshold gradient" (condition A1), a control technique designed in accordance with the techniques described herein may be configured to further restrict the usage of the HEU to help preserve battery life of the HEU by reducing fluctuations in charging/discharging of the HEU.

The inventors have recognized and appreciated that setting the threshold gradient a value appropriate for a particular application and expected usage may have an impact on the lifetime of the HEU. For example, if the threshold gradient is set too low (for instance, less than 2 kW/s in FIG. 7A), then the HPU may be over-utilized. This may result in the system having an overly low power dispatch capability during instances of high power ramp-up (e.g., when the driver abruptly accelerates the vehicle). On the other hand, if the threshold gradient is set too high (for instance, higher than 7 kW/s, as shown in FIG. 7A), then the HPU may be under-utilized, which may reduce the efficacy of the dual-energy energy storage system.

In some embodiments, a suitable threshold gradient may be chosen for a particular application by optimizing the power distribution and/or minimizing the peak power dispatched by the HEU. For the electrical vehicle application considered in FIG. 7A, a suitable operating threshold gradient may be in the range of 3-5 kW/s. In other implementations, a threshold gradient may be set in the range of 6-10 kW/s.

In some embodiments, a threshold gradient may be set dynamically. An initial threshold gradient may be set through an empirical simulation in which the combined energy storage system (e.g., HEU and HPU) is able to supply sufficient power throughout one or more conventional vehicle testing cycles when the prescribed dynamic threshold gradient is considered. Through empirical simulation, the second energy storage system (e.g., the HPU) may be confirmed to have a state of health decrease less than or equal to the first energy, storage system (e.g., the HEU). Of the viable threshold gradients which provide sufficient power at all time steps of the vehicle simulation cases, the threshold gradient that results in the minimum cycling of the first energy storage system may be selected as the initial threshold gradient. During usage of the combined energy storage system, the threshold gradient may be dynamically updated based, at least in part, on the health of the energy storage system(s). For example, the threshold gradient may be dynamically set based on the electrochemical state of the HEU and/or the HPU.

In some embodiments, a threshold gradient may be used to limit the power discharged by a first energy storage system (e.g., the HEU) when it is determined that power to be discharged by the first energy storage system is increasing at a rate that exceeds a threshold rate of power increase as defined by the threshold gradient. The inventors have recognized and appreciated that limiting ramping up of the power discharged by the first energy storage system may prolong lifetime for the system by reducing or eliminating large fluctuations in the discharge profile of the first energy storage system. In some embodiments, the power discharged by the first storage system may be limited to a sum of the power discharged by the first energy storage system in a previous time interval and a product of the threshold rate of power increase (the currently-set threshold gradient) and the amount of time between the previous time interval and the current time, interval (e.g., the time between system measurements). Alternatively, the power discharge of the first energy storage system may be limited in any other suitable way.

Figure 7B:
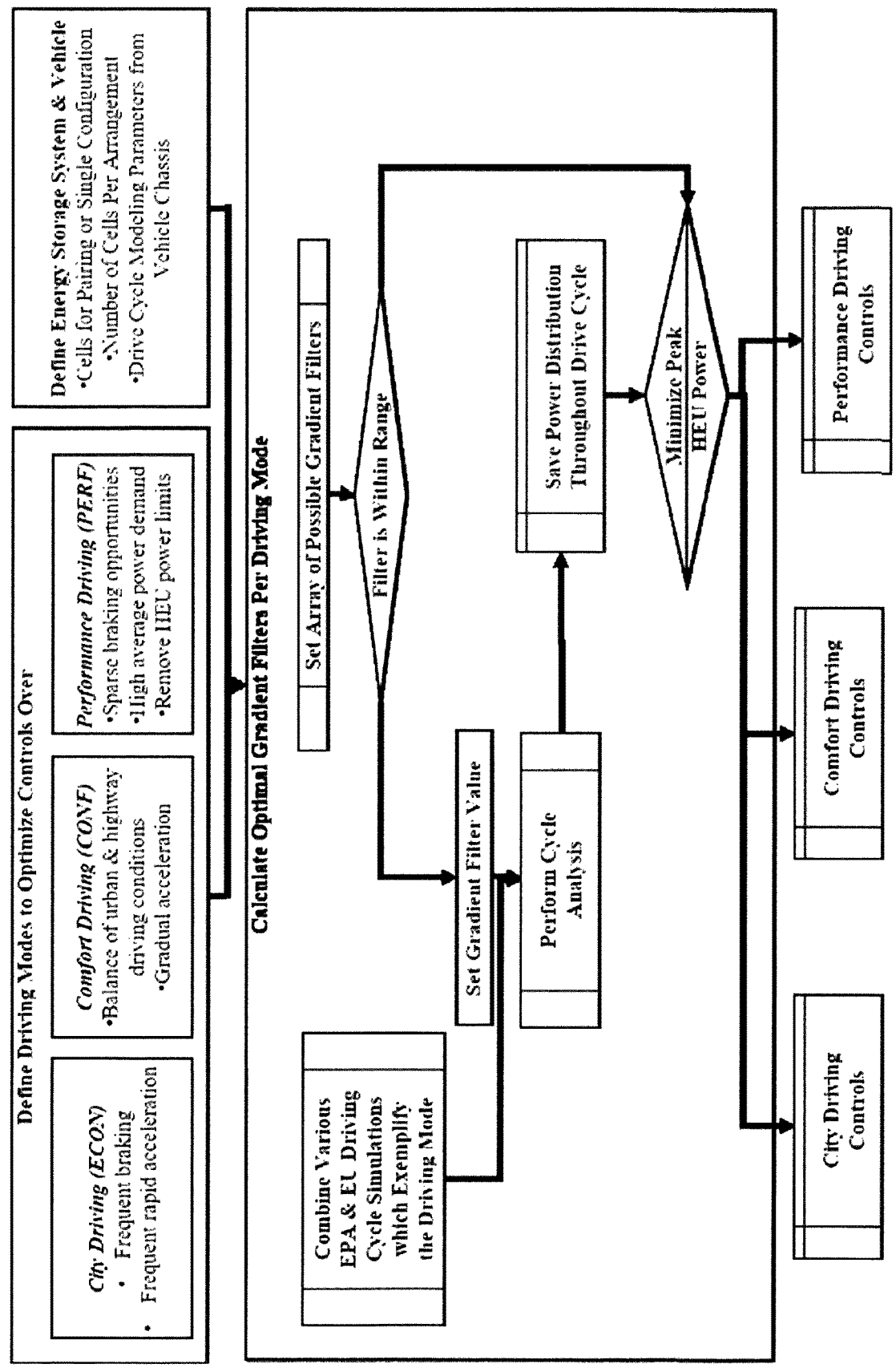
FIG. 7B shows an example of a threshold gradient technique, in accordance with some embodiments.

FIG. 7B shows an example of threshold gradient optimization techniques in accordance with some embodiments. It should be, noted that the system settings and driving modes may vary depending upon the particular situation, and the optimization techniques shown in FIG. 7B are merely exemplary. For example, the system may optimize for city driving (frequent braking and frequent rapid acceleration), comfort driving (balance of urban and highway diving conditions, typically with gradual acceleration), performance driving (relatively infrequent braking, high average power demand), and the like, respectively. Each driving mode may have one or more corresponding settings (e.g., a respective threshold gradient that is suitable for each driving mode). In some embodiments, a respective threshold gradient for each driving mode may be set by using simulations to exemplify conditions associated with that driving mode, and then setting the performance of the HEU and HPU of that driving mode compared to other viable configurations within the user-defined limits, accordingly.

Figure 8A:
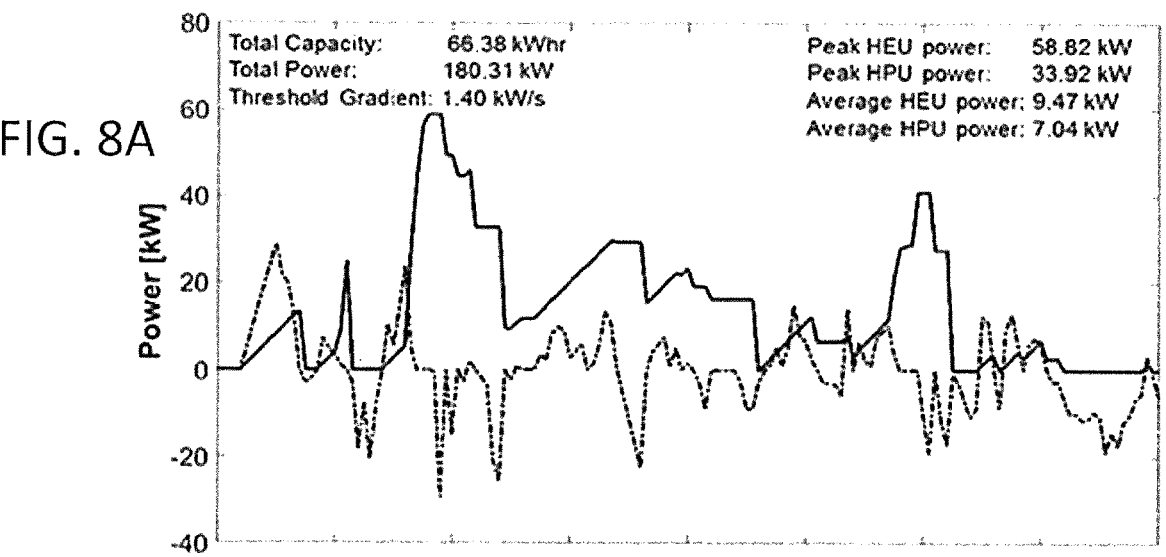
FIGS. 8A-8C show additional details of how selection of a control threshold gradient affects system performance in accordance with some embodiments.
Figure 8B:
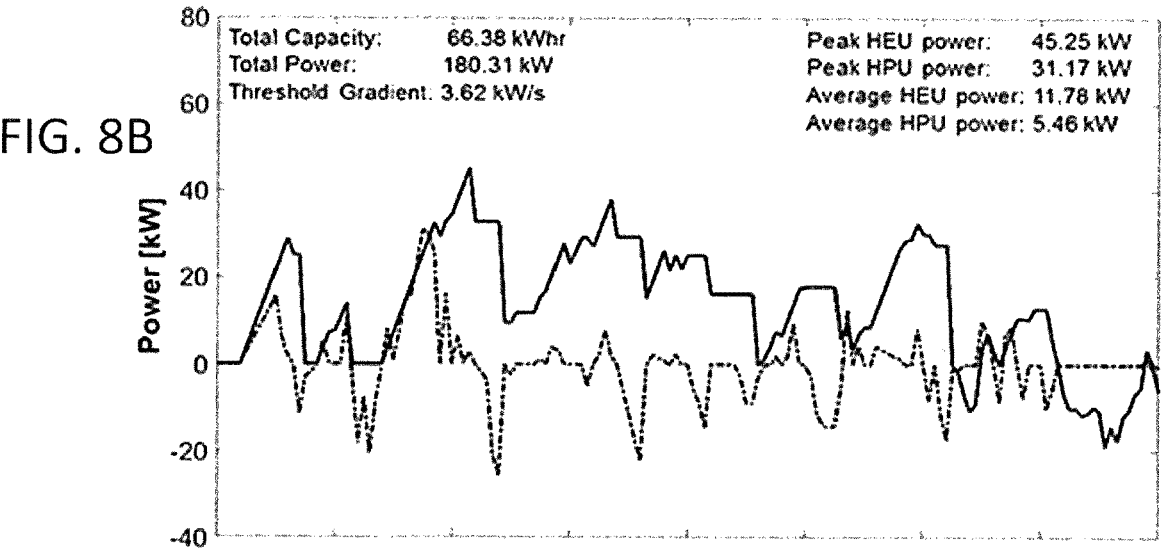
Figure 8C:
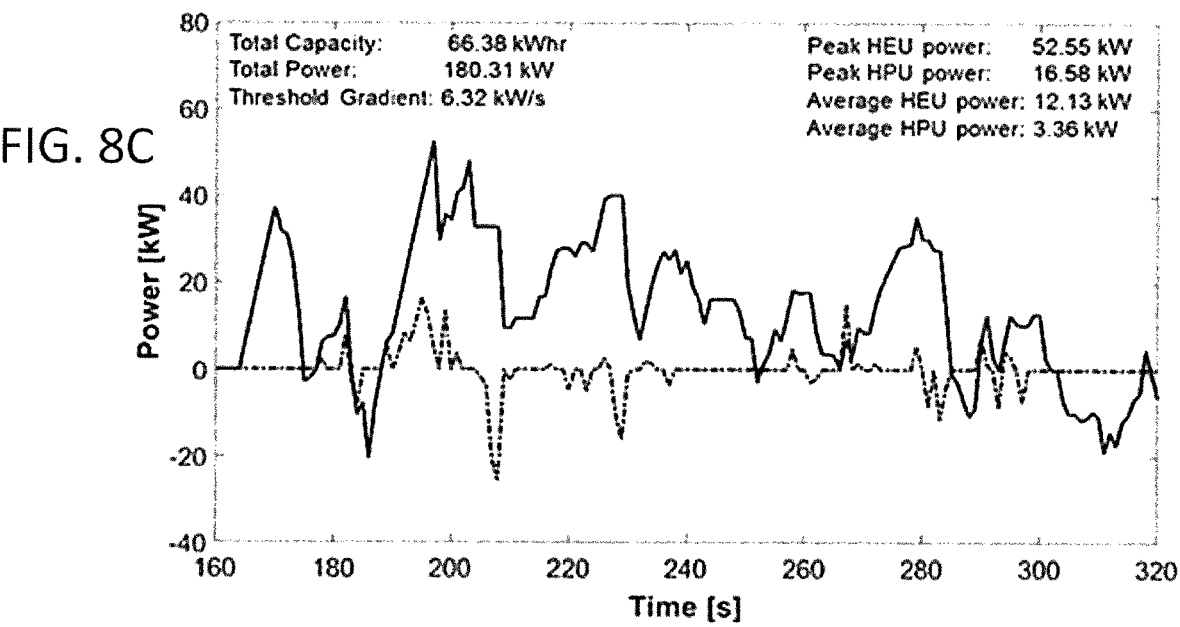

FIGS. 8A-C illustrate the role of a threshold gradient in the overall system power demand in accordance with some embodiments. For instance, FIGS. 8A-C illustrate three data points on the threshold optimization curve. FIG. 8A shows a low threshold gradient and under-utilization of HPU throughout the load cycle. FIG. 8B shows an optimal threshold gradient, which maximizes system performance, FIG. 8C shows an overestimated threshold gradient and exhaustion of the HPU energy reserves before peak power demand. The inventors have recognized and appreciated that these dynamics may be particularly important for systems in which the HPU has poor energy density, such as HPU systems that include ultracapacitors. For such configurations, the HPU can be exhausted in a matter of seconds, and implementation of power splitting optimization techniques described herein may be particularly valuable to ensure system viability.

In some embodiments, an electrical storage system design technique may be provided that takes into consideration dynamic power splitting between multiple energy storage systems in the design over a plurality of time intervals. The design technique may model the power demands of a particular application (e.g., a particular type of electric vehicle) and determine a recommended electrical storage system to supply the load cycle for the application. The design technique may use personalized user inputs, a weighted performance factor, and/or power splitting between multiple energy storage systems to determine recommended system configurations for a given application. The recommended system configurations presented to the user may be selected from candidate system configuration, which are able to supply power throughout the load cycle to meet the desired specifications, and may be ranked based on a weighted system performance index.

Figure 15:
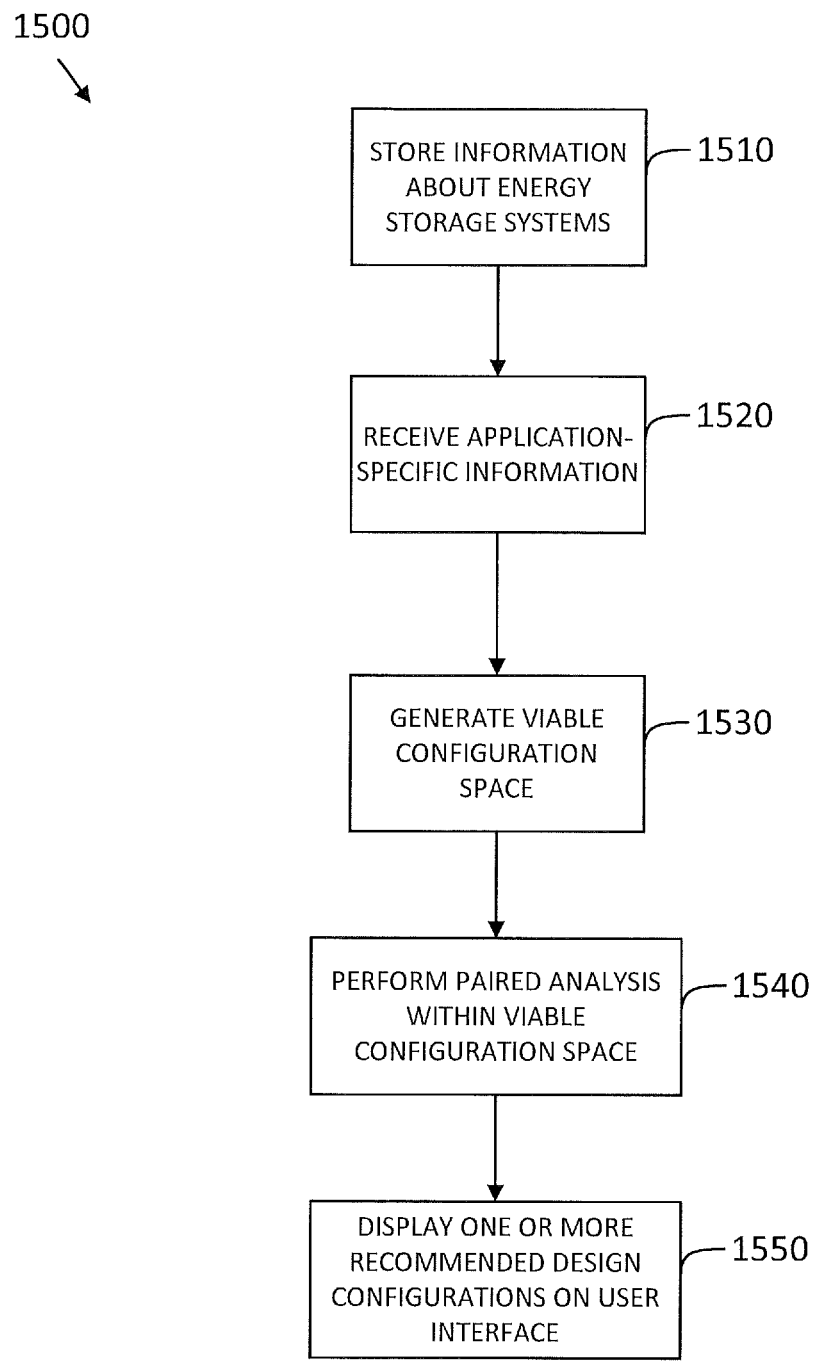
FIG. 15 illustrates a process for performing electrical storage system design in accordance with some embodiments.

FIG. 15 illustrates a flowchart of a process 1500 for performing energy system design optimization in accordance with some embodiments. In act 1510, information for a plurality of energy storage systems is stored (e.g., in a database). The information may be sourced, for example, from battery manufacturers, battery testing, and independent third party (e.g., national laboratory) reports, among other sources. The information may include characteristics of the energy storage system including, but not limited to, cost, weight, and/or charging/discharging characteristics.

Process 1500 then proceeds to act 1520, where application-specific information is input by a user. For example, the user provided information may include, but is not limited to, minimum viable performance (e.g., maximum system cost, minimum vehicle range, maximum system mass), performance preferences (e.g., cost, weight, power, range), error limits (e.g., margin, allowable instances), drive cycle information (e.g., urban, highway, rural), and vehicle type/parameters.

Figure 16:
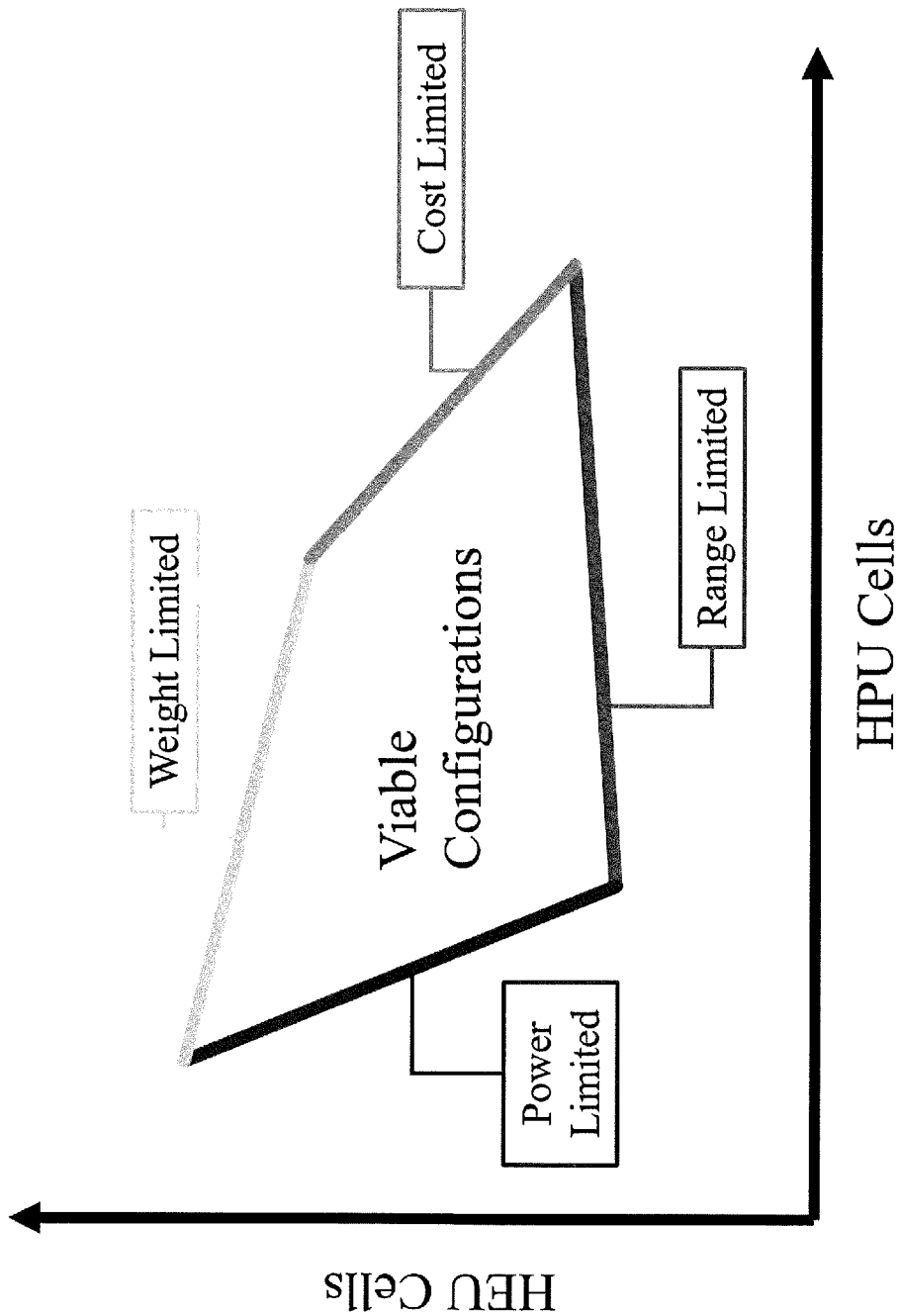
FIG. 16 schematically illustrates a viable configuration space generated using an energy storage system design technique in accordance with some embodiments.

Process 1500 then proceeds to act 1530, where a viable configuration space is generated based on the design requirements provided by the user and the stored information for the energy storage systems. An example viable configuration space for pairs of energy storage systems that include one or more HEU cells and one or more HPU cells is shown in FIG. 16. As shown, the bounds of the viable configuration space represent different performance or energy storage system characteristics associated with a particular application. The application associated with the viable configuration space in FIG. 16 is an electric vehicle. The left limit of the viable configuration space represents a minimum power required to satisfy the power requirements of the application, the upper limit of the viable configuration space represents a maximum weight limit for the system, the right limit of the viable configuration space represents a maximum cost for the system, and the lower limit of the viable configuration space represents a minimum range requirement for the system. It should be appreciated that the particular characteristics that set the bounds of the viable configuration space may be different depending on the particular application that is being modeled. It should be appreciated that while the limits are shown as straight lines in the example of FIG. 16, in some instances one or more of the limits may be curved. Moreover, in some instances, a limit may dominate another limit (e.g., cost dominating weight, or vice versa), so that the viable configuration space may have al triangular shape (e.g., in the example of FIG. 13).

Process 1500 then proceeds to act 1540, where the performance of pairs of energy storage systems are analyzed within the viable configuration space. In some embodiments, relative performance index is a measure used to quantify the performance of each pair. An example for calculating relative performance index is as follows:

$$RPI = CP\left(\frac{price}{min(price)}\right) + RP\left(\frac{max(range)}{range}\right) + MP\left(\frac{mass}{min(mass)}\right) + PP\left(\frac{max(power)}{power}\right),$$

where CP, RP, MP, and PP are user-defined weightings (e.g., percentages that add up to 100%) that express a relative importance of cost, range, mass, and power. The RPI value for an optimal case is 1, where the lowest cost, the maximum range, the lowest mass, and the maximum power are all achieved. Lower values of RPI denote local minima within the viable configuration space for a given energy storage system pairing. For pairs with higher RPI values, a detailed dynamic power splitting analysis is performed (e.g., using the process shown in FIG. 6B) until there is a particular number of systems which supply sufficient power throughout the load cycle. The RPI may then be recalculated from the maximum and minimum values for the top-performing pairs output from the power splitting analysis to sort the final output based on performance. In some embodiments, the performance of single energy storage systems may also be determined and compared to dual-chemistry implementations.

Process 1500 then proceeds to act 1550, where one or more of the top-performing "recommended" design configurations for the electrical storage system are displayed, for example, on a graphical user interface, examples of which are described in more detail below.

Figure 9A:
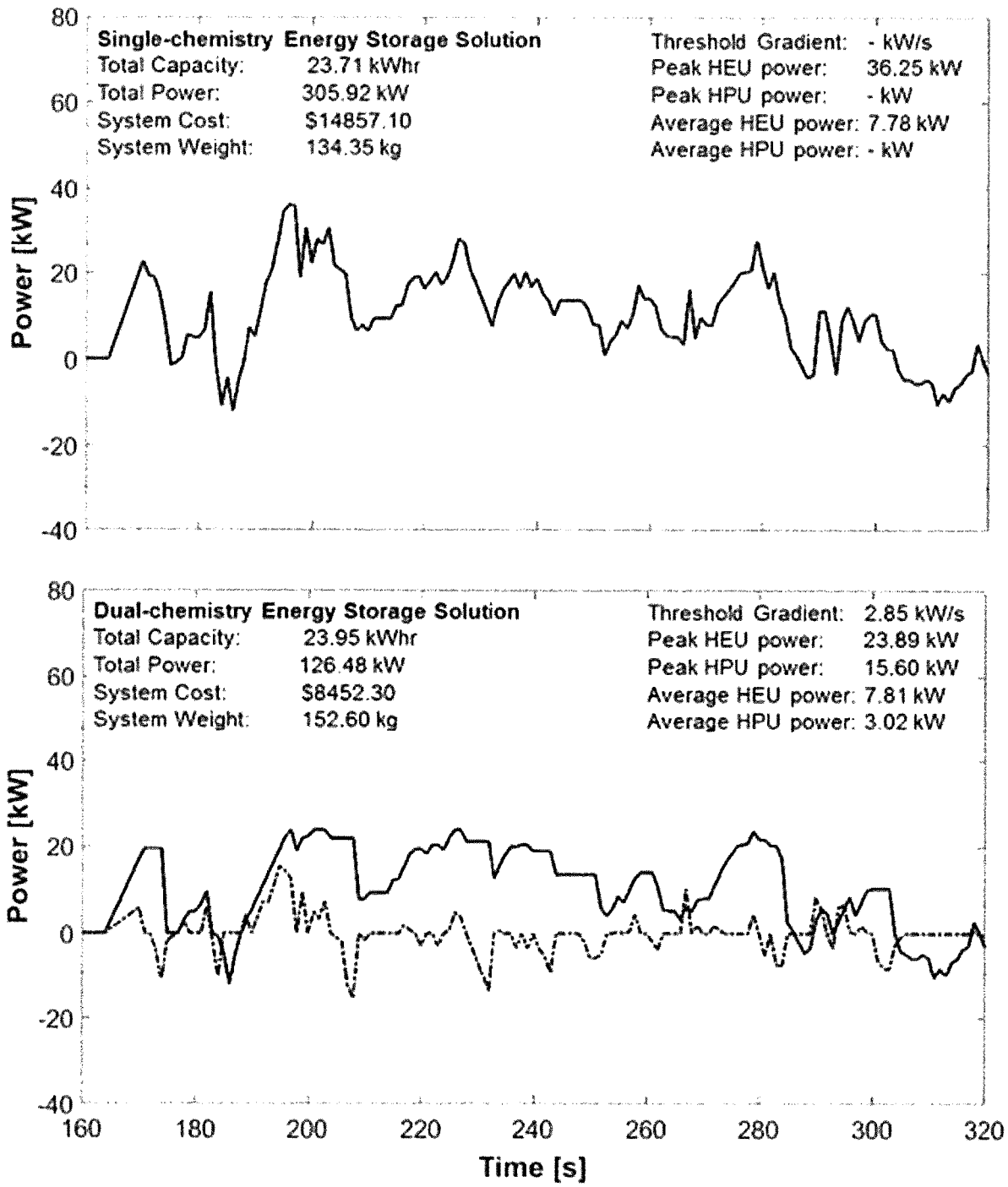
FIG. 9A shows a comparison between single-energy storage and dual-energy storage configurations output from an energy storage design technique in accordance with some embodiments.

FIG. 9A shows the output of an electrical storage system design technique (e.g., the design optimization technique described in the FIG. 15) in accordance with some embodiments. In particular, FIG. 9A shows graphs comparing performance of the most cost effective single chemistry system (top) and the most cost effective dual-energy storage system (bottom) for an electric vehicle simulated in an illustrative urban driving cycle. In the example of FIG. 9A, the threshold gradient for the dual-energy solution was chosen to minimize the peak HEU power. As shown, although the dual-energy HEU-HPU based system is heavier than the single chemistry (HEU only) based system, the dual-energy system is significantly cheaper to operate by making more efficient use of available electrical power through intelligent use of high power units (with high cost-power ratio) during time intervals where power demand is high (such as during acceleration).

Figure 9B:
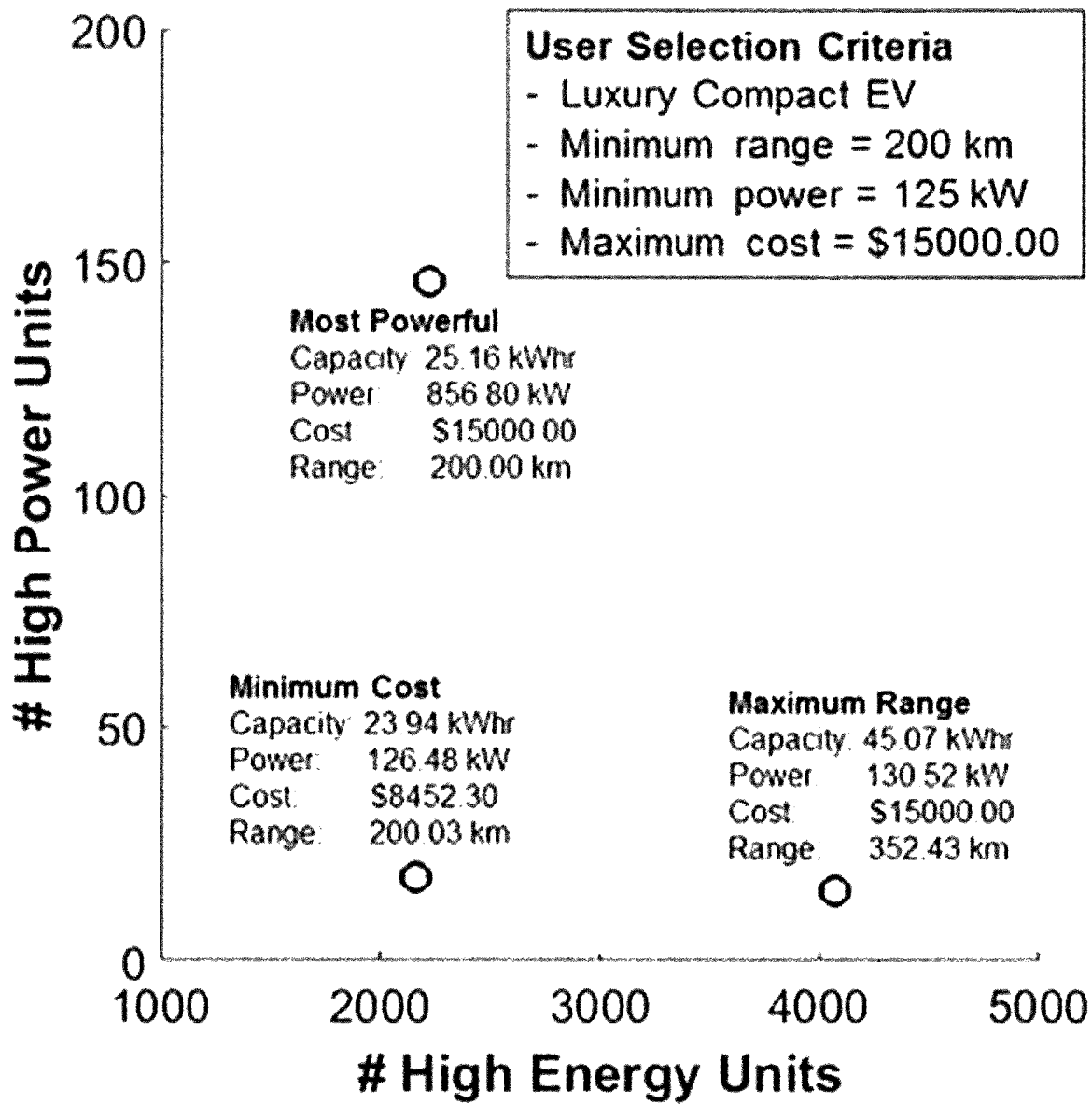
FIG. 9B shows a scatter plot showing user preferences provided as input to an energy storage design technique in accordance with some embodiments.

FIG. 9B shows a scatter plot showing user preferences, which may also be provided as input to the design optimization.

Example Simulations

To illustrate how the dual HEU-HPU based control technique described herein operates, scenarios with different input variables were simulated by inputting the variables using a graphical user interface (GUI). Note that when simulation is not required (e.g., during use of an electric vehicle or other application), the control techniques described herein may operate automatically without such user intervention.

Figures 1, 11:
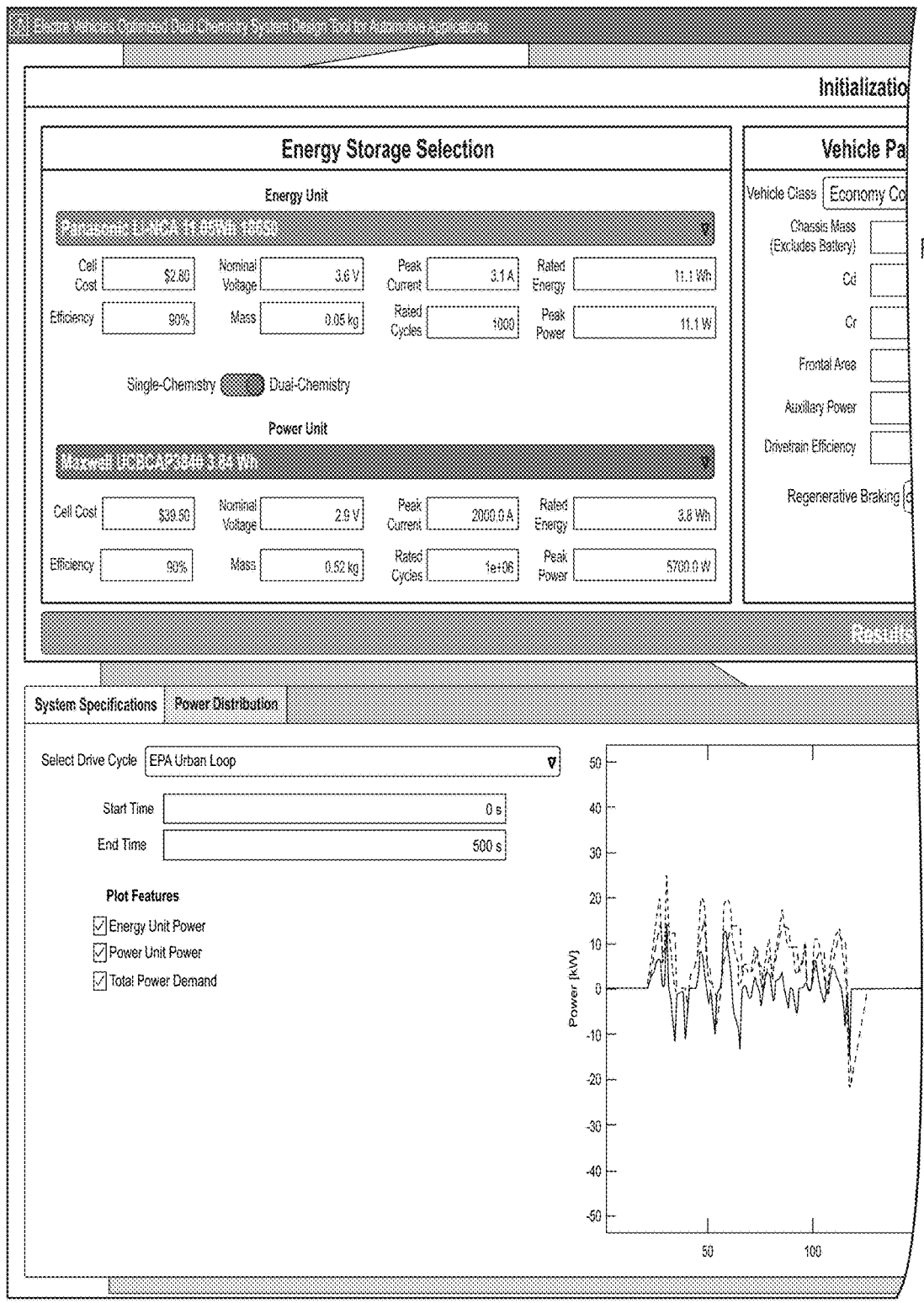
FIG. 11 shows an example of a graphical user interface (GUI) used in accordance with some embodiments to show power profiles computed using a design technique.
Figures 2, 11:
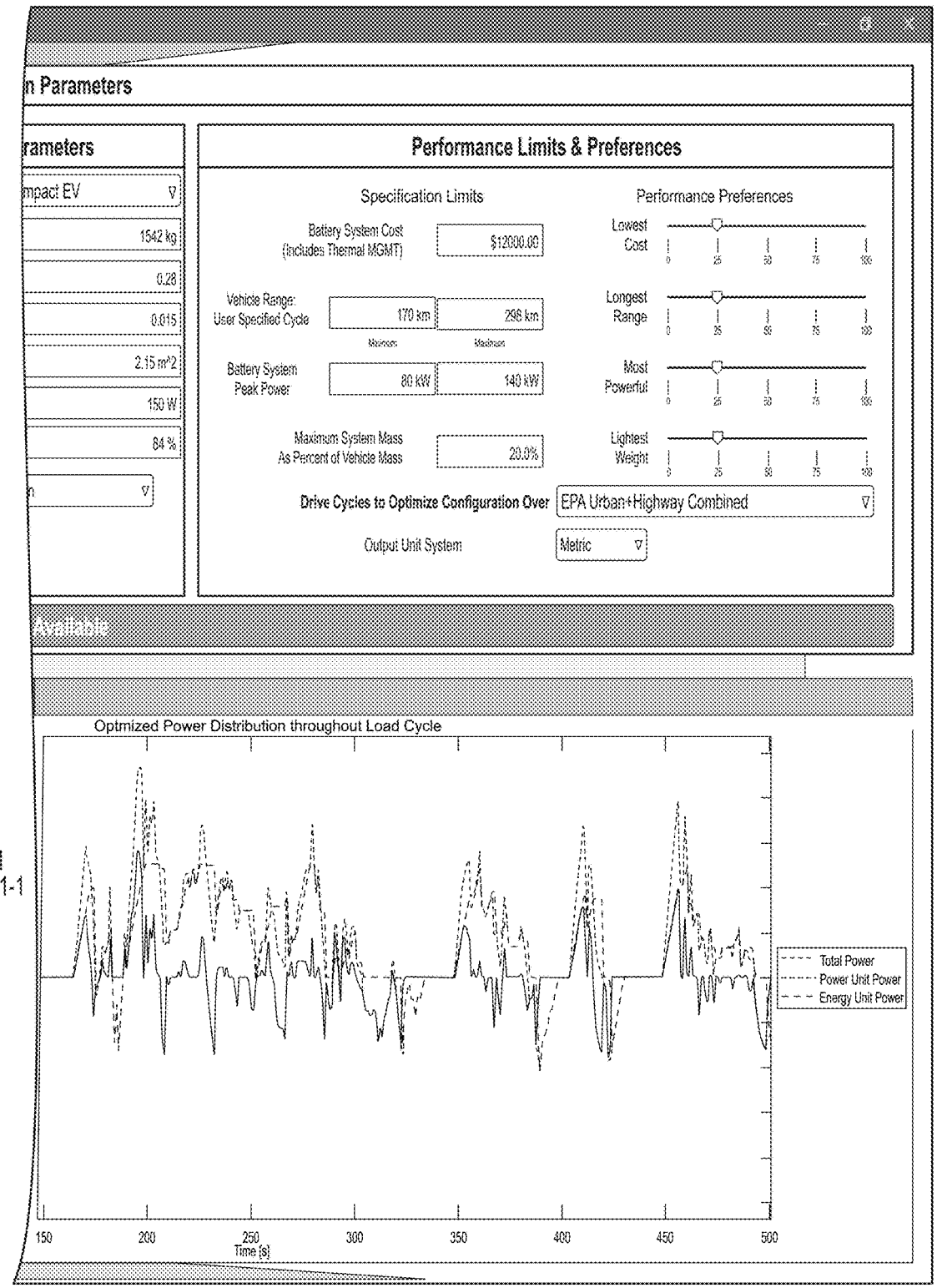

The illustrative GUI shown in FIGS. 10 and 11 shows how the design techniques operate under different conditions. The GUI shown in FIGS. 10 and 11 separates the initialization parameters and analysis output into the upper and lower panels, so that the user inputs data, and reads the output, in a left-to-right, top-to-bottom manner:

In the example of FIG. 10, the leftmost subpanel (Energy storage selection) allows the simulation to be initialized with various types of energy storage systems. This simulator allows the user to change the simulator from a single chemistry energy storage system to a dual chemistry energy system. In this simulation, the drop down menus are automatically populated by cells from an energy storage database of industry-leading cells. Beneath each dropdown menu, the GUI displays relevant charge and discharge characteristics for each cell, and its relative cost.

Here, the selected HEU is a Panasonic Li-NCA 11.05 Wh (Watt/hour) 18650 lithium ion based battery power system, and the HPU is a Maxwell UCBCAP3840 3.84 Wh supercapacitor/Ultracapacitor type energy storage system. The relative cell costs, storage efficiencies, voltages, mass, peak currents, rated cycles, rated energy, and peak power for the respective HEU-HPU units are also shown.

In this simulation, the application is an electric vehicle—specifically an economy compact electric vehicle. The central panel in the GUI of FIGS. 10 and 11 defines the vehicle properties, which the simulator uses for analyzing the power load cycle being simulated, as well as and optimizing the power distribution for this type of power load. This panel also contains a dropdown menu and displays the relevant kinematic modeling parameters for the generalized modeling. Various factors include the vehicle chassis mass (excluding the battery), coefficient of air resistance, frontal area of the vehicle, auxiliary power, drivetrain efficiency, and options to enable or disable regenerative braking.

By changing the selection of the dropdown menu at the top of the panel, the simulator adjusts the kinematic modeling parameters to the generalized values for a given case study. Unlike with the energy storage selection panel, these simulator values can be adjusted by the user to better model the driving dynamics for any given use case.

The rightmost initialization panel of the GUI in FIGS. 10 and 11 is used to configure the simulator for the possible configurations for a given use case. Here, the user can define various overall system parameters such as: battery system cost, vehicle range, battery system peak power, and relative mass of the battery system as a percent of the vehicle mass. Within these parameters, the performance preferences, shown at the far right of this panel, establish the relative performance index (RPI) of each given configuration, accounting for the relative importance of cost (CP), range (RP), power (PP), and weight (MP), as defined by the user. Other parameters, such as driving conditions (here EPA Urban+Highway combined conditions are used) and choice of system outputs (English/Metric) can also be selected.

Based upon these performance preferences, and the landscape of viable configurations, the system which exhibits the greatest RPI (i.e., the "recommended system") may be presented as the optimal configuration.

The lower portion of the GUI in FIGS. 10 and 11 is used to display the performance specifications of the recommended system and illustrate the optimized power distribution within a load cycle (e.g., simulation of power use while driving, in this example).

The primary results tab, shown on the bottom left of the GUI in FIG. 10, presents the recommended configuration for single- and dual-energy systems, as evaluated by the optimization techniques described herein. In addition, this window is used to display the specifications of each recommended configuration. Other parameters, such as system cost, peak power, rated energy, estimated EPA driving range in the city and highway, EPA combined average driving range, system efficiency, estimated time (in seconds) to go from 0 to 60 miles per hour, and the estimated quarter-mile acceleration range are also shown.

The simulator also shows the division of power and energy between the HEU and HPU units. This helps illustrate the benefits of the energy management techniques described herein.

The rightmost bottom tab, shown in the GUI of FIG. 11, (lower portion of the figure) plots the power distribution for the optimized control technique for the given system configuration to maximize system performance and lifetime. Here a load cycle is defined by a dropdown menu located to the right of the graph. The inputs define the simulation time range (shown in the plot), and the particular power load cycle to analyze. The toggle buttons also select which power profiles are included in the graph, including these notable examples:

HEU, HPU, Total—gives complete picture of load cycle breakdown

HEU, Total—highlights savings in peak power and ramps allowed by adding HPU

Figures 1, 12:
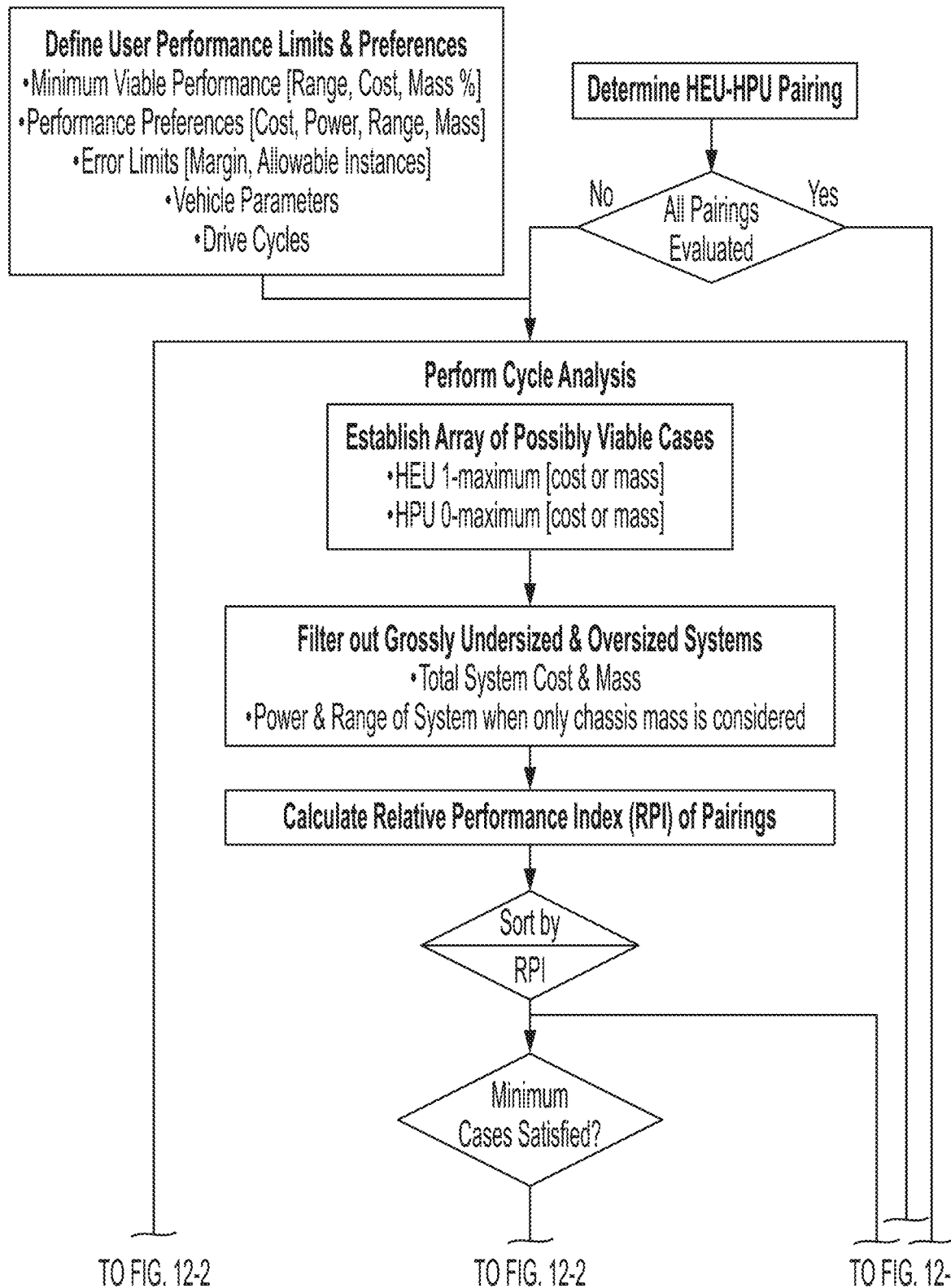
FIG. 12 shows a flowchart of a process for performing energy system design in accordance with some embodiments.
Figures 2, 12:
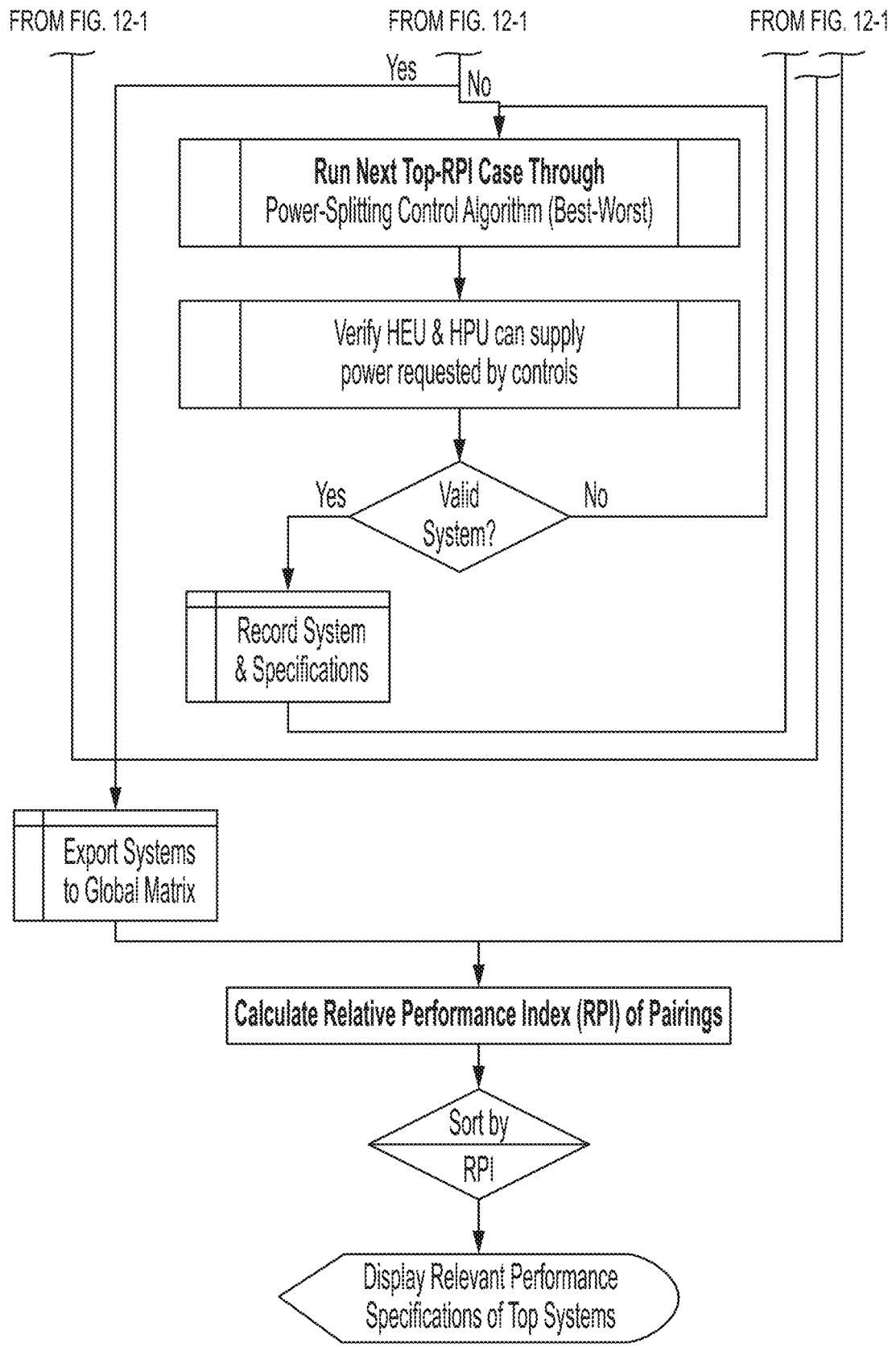

HPU, Total—highlights all instances of peak/ramp shaving, and regenerative braking FIG. 12 illustrates a flowchart showing how the relative characteristics of a vehicle's HEU and HPU combination (HEU-HPU pairing) may be automatically optimized over various parameters, such as minimum viable performance (e.g., range, cost, HEU-HPU weight as a percentage of vehicle weight), performance preferences (which also includes cost calculations), various error margins, vehicle parameters, and various driving cycles, in accordance with some embodiments. This technique computes various relative performance indexes of various HEU and HPU paired configurations, checks that a possible HEU-HPU paring performs above certain minimum parameters, and stores a record of the valid systems and specifications in a database for later analysis.

Figure 13:
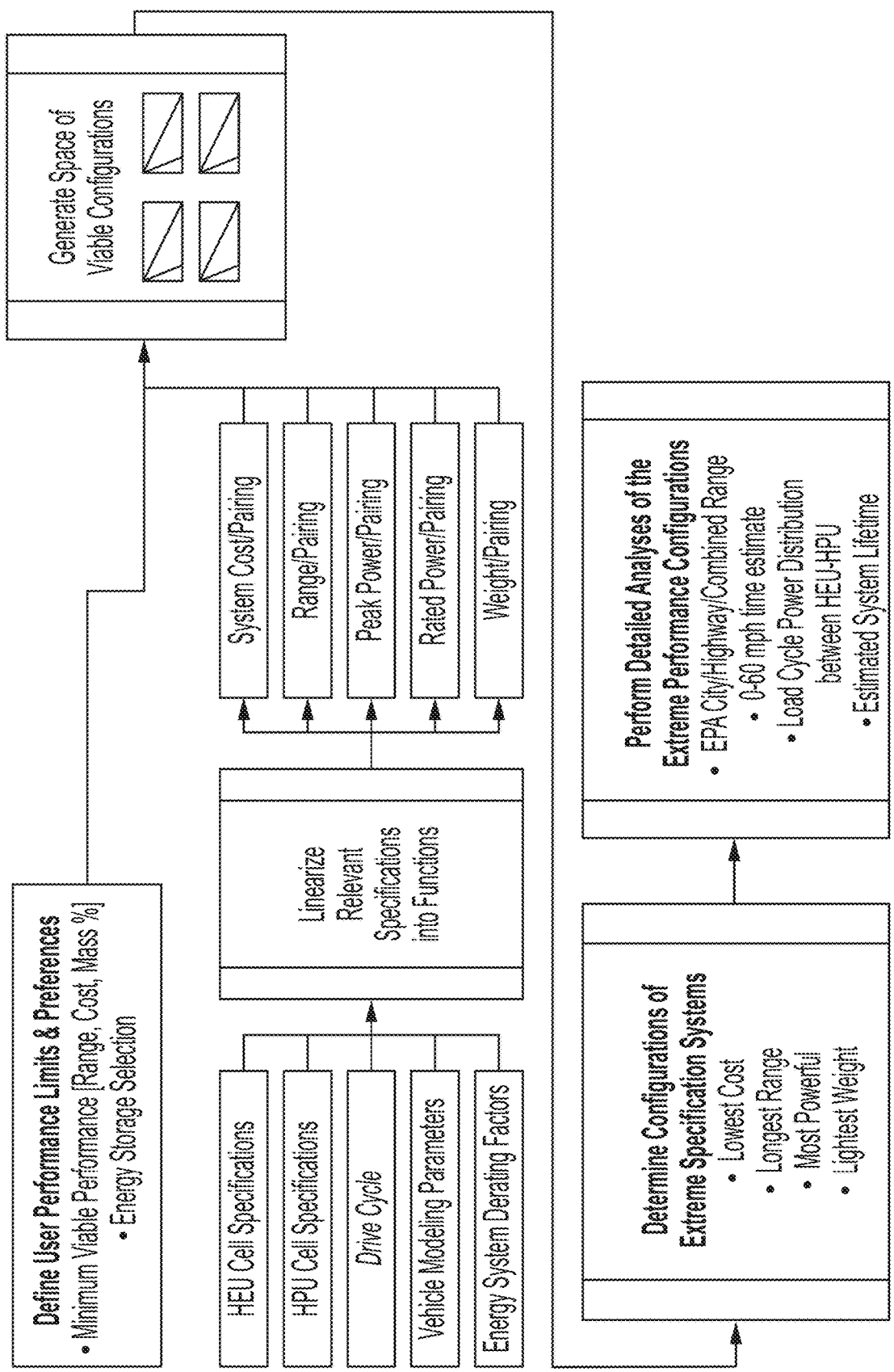
FIG. 13 shows an overview of a process for performing energy system design in accordance with some embodiments.

FIG. 13 illustrates an optimal configuration flowchart showing how, after the user performance limits and preferences (e.g. minimum range, maximum cost, minimum rated power, and maximum allowable energy storage system mass), and energy storage selection (e.g., type of HEU and HPU), as well as input information such as HEU cell specifications, HPU cell specifications, drive cycle, vehicle modeling parameters, and energy system derating factors, are considered, the system generates a large number of viable vehicle and HEU-HPU configurations, in accordance with some embodiments. For instance the system transforms the inputs into representations to approximate cost, range, power and weight for each of the HEU-HPU pairings.

After generating the representations, the extreme specification limits of these various configurations (e.g. lowest cost, longest range, most powerful, lightest weight) may be selected, and a more detailed analysis may be performed. This detailed analysis may include, for example, calculations of EPA City/Highway combined range, 0-60 mile per hour time estimate, load cycle power distribution between the HEU and HPU, and/or the estimated system lifetime (e.g. based on number of charge/discharge cycles a given HEU or HPU is likely to tolerate).

In some embodiments, machine learning methods, which may be based on the use of one or more machine learning software packages and techniques such as TensorFlow, Scikit-learn, shogun. Accord.Net framework, Apache Mahout, Spark MLib, H2O, Cloudera Oryx, GoLearn, Weka, Deeplearn.js, ConvNetJS, etc. or other techniques may be used to further optimize the HEU-HPU charging and discharging process. For example, these optimization techniques may be implemented in a manner similar to the optimization techniques previously described in FIG. 6B, but can include additional machine learning optimized steps to further improve the efficiency of the process.

Figures 1, 14A:
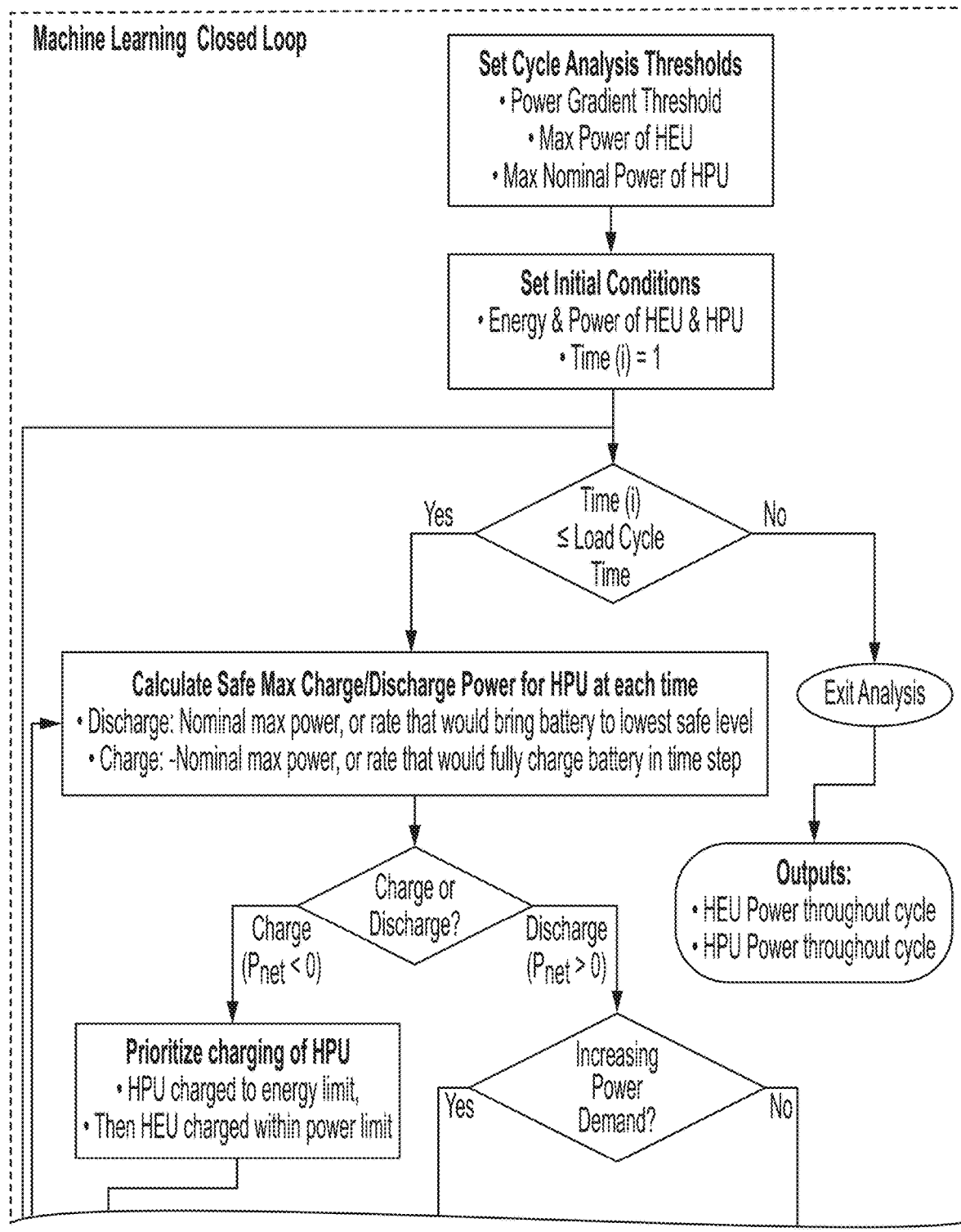
FIG. 14A shows an example of a control technique that incorporates machine learning in accordance with some embodiments.
Figures 2, 14A:
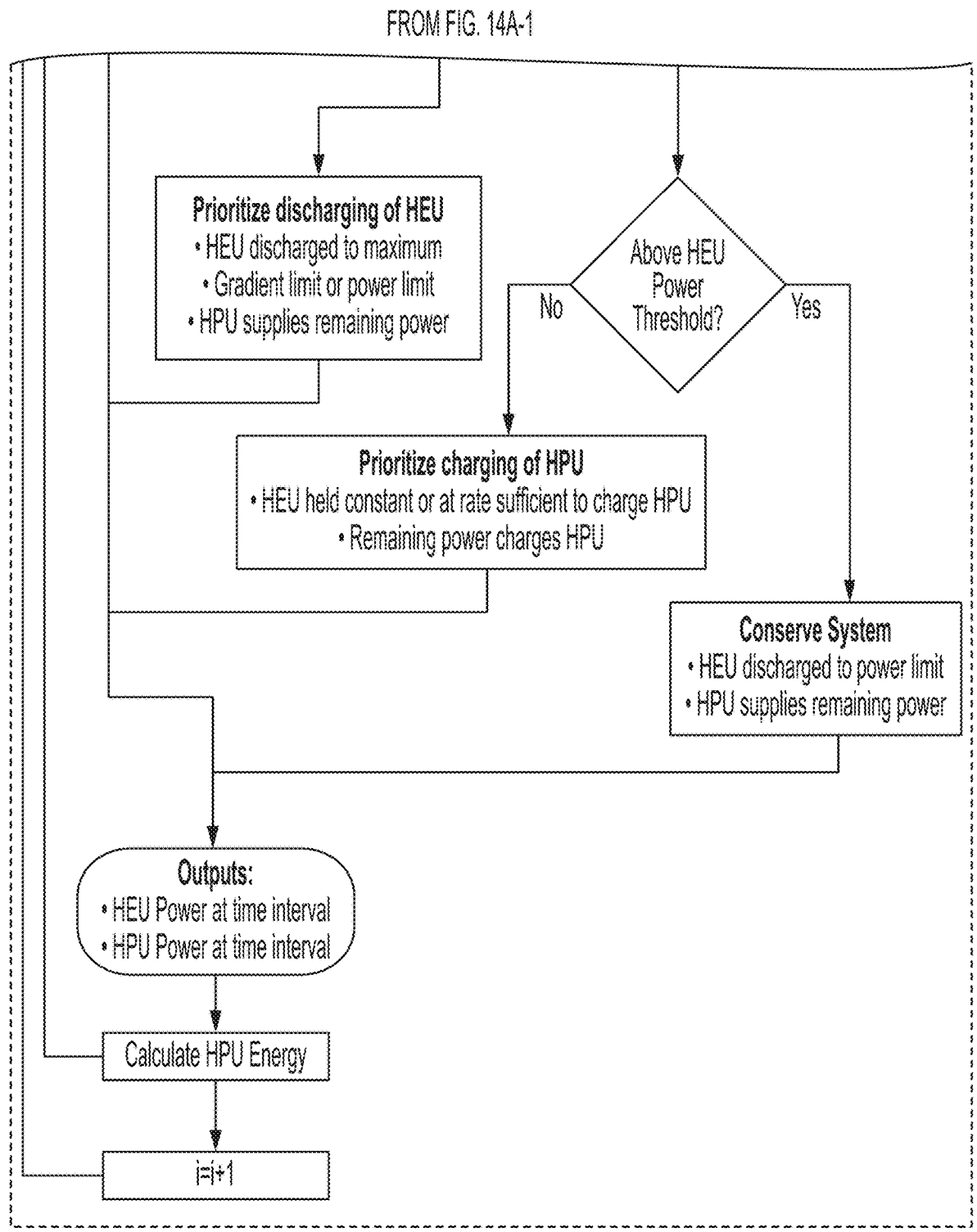
Figures 1, 14B:
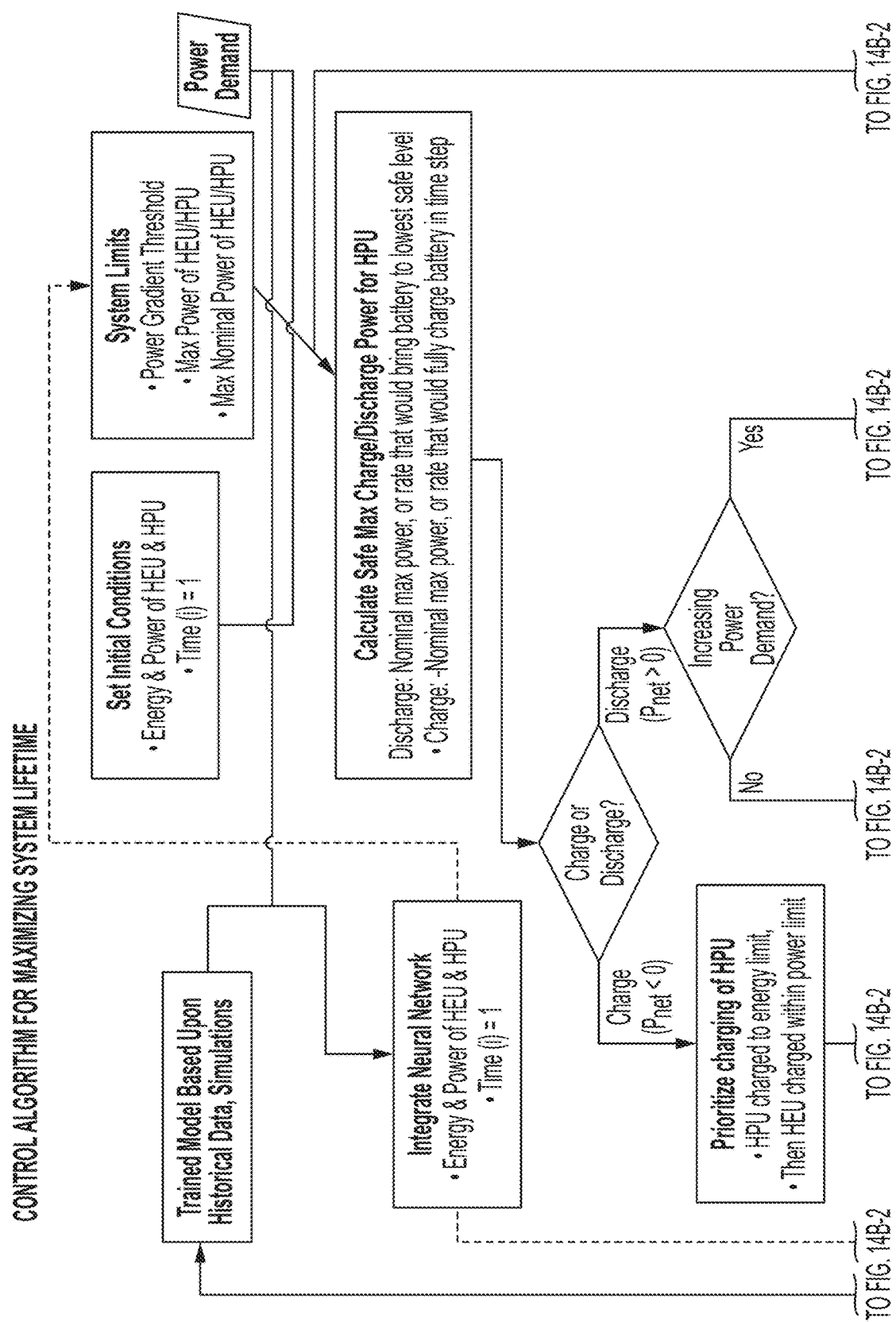
FIG. 14B shows a control technique for maximizing system lifetime that incorporates machine learning in accordance with some embodiments.

FIG. 14A shows an example of a control technique that incorporates machine learning. FIG. 14B shows an illustrative control technique for maximizing system lifetime that also incorporates machine learning.

Machine learning techniques are also used in some embodiments to help maximize the lifetime of the HEU-HEU system. For example a neural network or other machine learning software can be trained based, for example, on historical data and various simulations, to optimize the HEU and HPU power cycles in a manner that takes the charging/discharging lifetime characteristics of the HEU and HPU power units into account, as well as the system's power demand situations (as previously discussed in FIGS. 6B and 14A).

In some embodiments, one or more of the techniques described herein may be used for battery or ultracapacitor type electrical storage systems employing only a single type of chemistry. In other embodiments, the electrical storage systems may employ more than two different types energy storage systems (e.g., energy storage systems with more than two types of chemistries).

Some embodiments are directed to an energy storage system comprising at least one first energy storage device and at least one second energy storage device, wherein the at least one first energy storage device and the at least one second energy storage device are configured to supply energy to an application; the at least one first energy storage device has a higher energy storage density than the at least one second energy storage device; and the at least one second energy storage device has a higher power output than the first at least one energy storage device; and at least one processor. The at least one processor is programmed to determine whether a power demand, P(t), of the application is increasing at a current time instant t; and in response to determining that the power demand, P(t), of the application is increasing: use the at least one first energy storage device to supply an amount of power, $P_{EU}(t)$, to the application at the current time instant t, wherein the amount of power, $P_{EU}(t)$, is determined based on: (i) an amount of power, $P_{EU}(t-1)$, supplied to the application by the at least one first energy storage device at a previous time instant t−1, and (ii) a selected threshold gradient, $dP_{threshold}$, associated with the at least one first energy storage device; and use the at least one second energy storage device to supply an amount of power, $P_{PU}(t)$, to the application at the current time instant t, wherein the amount of power. $P_{PU}(t)$, is determined based on: (i) the power demand, P(t), of the application, and (ii) the amount of power, $P_{EU}(t)$, supplied to the application by the at least one first energy storage device at the current time instant t.

In some embodiments, the amount of power, $P_{EU}(t)$, supplied to the application by the at least one first energy storage device at the current time instant t is no greater than a sum of: (i) the amount of power, $P_{EU}(t-1)$, supplied to the application by the at least one first energy storage device at a previous time instant t−1, and (ii) the selected threshold gradient, $dP_{threshold}$, associated with the at least one first energy storage device.

In some embodiments, the amount of power, $P_{EU}(t)$, supplied to the application by, the at least one first energy storage device at the current time instant t is also no greater than a nominal power rating, $P_{EU,nom}$, of the at least one first energy storage device.

In some embodiments, the amount of power, $P_{PU}(t)$, supplied to the application by the at least one second energy storage device at the current time instant t is determined based on a difference between: (i) the power demand, P(t), of the application, and (ii) the amount of power. $P_{EU}(t)$, supplied to the application by the at least one first energy storage device at the current time instant t.

In some embodiments, the at least one processor is further configured to in response to determining that the power demand, P(t), of the application is not increasing: determine whether the power demand, P(t), of the application exceeds a nominal power rating, $P_{EU,nom}$, of the at least one first energy storage device.

In some embodiments, the at least one processor is further configured to: in response to determining that the power demand, P(t), of the application does not exceed the nominal power rating, $P_{EU,nom}$, of the at least one first energy storage device: use the at least one first energy storage device to supply an amount of power, $P_{EU}(t)$, to the application at the current time instant t, wherein the amount of power, $P_{EU}(t)$, is no greater than the amount of power, $P_{EU}(t-1)$, supplied to the application by the at least one first energy storage device at the previous time instant t−1; and use the at least one first energy storage device to charge the at least one second energy storage device.

In some embodiments, the at least one processor is further configured to: in response to determining that the power demand, P(t), of the application exceeds the nominal power rating, $P_{EU,nom}$, of the at least one first energy storage device: use the at least one first energy storage device to supply an amount of power, $P_{EU}(t)$, to the application at the current time instant t, wherein: the amount of power, $P_{EU}(t)$, is no greater than $2 \times P_{EU}(t-1) - P_{EU}(t-2)$, wherein $P_{EU}(t-1)$ is the amount of power supplied to the application by the at least one first energy storage device at the previous time instant t−1 and $P_{EU}(t-2)$, is an amount of power supplied to the application by the at least one first energy storage device at a previous time instant t−2; the amount of power, $P_{EU}(t)$, is also no greater than the nominal power rating, $P_{EU,nom}$, of the at least one first energy storage device; and use the at least one second energy storage device to supply an amount of power, $P_{PU}(t)$, to the application at the current time instant t, wherein the amount of power, $P_{PU}(t)$, is determined based on the power demand, P(t), of the application and the amount of power, $P_{EU}(t)$, supplied to the application by the at least one first energy storage device at the current time instant t.

In some embodiments, the at least one first energy storage device and the at least one second energy storage device are further configured to receive energy from the application; and the at least one processor is further configured to: determine if energy is being supplied to, or received from, the application, wherein the at least one processor is configured to determine whether the power demand, P(t), of the application is increasing in response to determining that energy is being supplied to the application.

In some embodiments, the at least one processor is further configured to: in response to determining that energy is being received from the application, prioritize charging of the at least one second energy storage device over charging of the at least one first energy storage device.

Some embodiments are directed to an automated method of managing a discharging and charging status of an electrical storage system configured to supply and receive electrical power from an application. The method comprises receiving, using at least one processor, application electrical power utilization data from at least one application electrical power sensor over a plurality of time intervals, determining, using said at least one processor, electrical power utilization parameters comprising application charging-discharging status from said electrical storage system, magnitude of application electrical power utilization, and rates of change of said electrical power utilization, said electrical storage system comprising at least a High Energy Unit (HEU) and a High Power unit (HPU), said HEU having a higher electrical power storage density than said HPU, and said HPU having a higher electrical power output than said HEU, further determining, using said at least one processor and at least one HEU and HPU electrical status sensor, an electrical charge status of said HEU and HPU, controlling, using said at least one processor, said electrical power utilization parameters, and an optimization technique, which HEU and HPU are to be used in any of said application charging-discharging and HEU-HPU power transfers within said electrical storage system, wherein said optimization technique comprises mathematical models describing physical and electrical properties of said application, said HEU, and said HPU, and wherein said optimization technique further uses said electrical charge status of said HEU and HPU to control which HEU and HPU are to be used in any of said application charging-discharging and HEU-HPU power transfers within said electrical storage system.

In some embodiments, said optimization technique is configured to prioritize drawing power from both said HEU and said HPU when said electrical power utilization parameters show that said application is drawing power in excess of a first HEU output power threshold, and said rates of change of said electrical power utilization are increasing with time.

In some embodiments, said optimization technique is configured to transfer excess electrical power from said HEU to said HPU when said electrical power utilization parameters show that said application is drawing power wider a first HEU output power threshold, and said rates of change of said electrical power utilization are decreasing with time.

In some embodiments, said optimization technique is configured to prioritize transferring any electrical power received from said application to said HPU to recharge said HPU, until said HPU is fully recharged.

In some embodiments, said HEU and said HPU comprise batteries employing different types of battery chemistry, or wherein said HEU is a battery, and said HPU is a supercapacitor or ultracapacitor.

In some embodiments, said application is any of an electric vehicle application or an electric power grid application.

Some embodiments are directed to an electrical storage system configured to supply and receive electrical power from an application. The system comprises at least one processor configured to receive application electrical power utilization data from at least one application electrical power sensor over a plurality of time intervals, said at least one processor further configured to determine electrical power utilization parameters comprising application charging-discharging status from said electrical storage system, magnitude of application electrical power utilization, and rates of change of said electrical power utilization, said electrical storage system comprising at least a High Energy Unit (HEU) and a High Power unit (HPU), said HEU having a higher electrical power storage density than said HPU, and said HPU having a higher electrical power output than said HEU, said at least one processor and at least one HEU and HPU electrical status sensor further configured to determine an electrical charge status of said HEU and HPU, said at least one processor, said electrical power utilization parameters, and an optimization technique further configured to determine which HEU and HPU are to be used in any of said application charging-discharging and HEU-HPU power transfers within said electrical storage system, wherein said optimization technique comprises mathematical models describing physical and electrical properties of said application, said HEU, and said HPU, and wherein said optimization technique further uses said electrical charge status of said HEU and HPU to control which HEU and HPU are to be used in any of said application charging-discharging and HEU-HPU power transfers within said electrical storage system.

Having thus described several aspects of at least one embodiment, it s to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The invention claimed is:

1. A computerized system configured to design an electrical storage system, the system comprising:
   at least one computer processor; and
   at least one non-transitory computer readable medium encoded with a plurality of instructions that, when executed by the at least one computer processor, perform a method comprising:
      generating, based on one or more design requirements and information for a plurality of energy storage systems including a first type of energy storage system and a second type of energy storage system different from the first type of energy storage system, a viable configuration space;
      determining, for each of multiple pairs of energy storage systems in the plurality of energy storage systems having characteristics that fall within the viable configuration space, a performance measure of the pair, wherein determining the performance measure comprises using simulation to evaluate a control strategy that dynamically splits power provided and/or stored by the first and second energy storage systems in the pair during each of a plurality of time intervals, wherein the simulation predicts a state of health of the first type of energy storage system and/or the second type of energy storage system of the pair after a certain number of charging/discharging cycles under certain conditions; and
      providing, on a user interface, an indication of a pair of energy storage systems selected based on the performance measure.

2. The computerized system of claim 1, further comprising generating the viable configuration space to have one or more bounds selected from the group consisting of range, cost, weight, and power.

3. The computerized system of claim 1, wherein the one or more design requirements include one or more relative performance preferences selected from the group consisting of cost, weight, power and range.

4. The computerized system of claim 1, wherein the one or more design requirements include drive cycle characteristics.

5. The computerized system of claim 1, wherein the one or more design requirements include vehicle parameters.

6. The computerized system of claim 3, wherein determining the performance measure of the pair further comprises determining based, at least in part on the one or more relative performance preferences, a ranking of the pair of energy storage systems relative to one or more other pairs of energy storage systems having characteristics that fall within the viable configuration space.

7. The computerized system of claim 1, wherein the at least one computer processor is further programmed to provide on the user interface, a graphical representation of the evaluated control strategy that dynamically splits power provided and/or stored by the first and second energy storage systems in the pair during each of the plurality of time intervals.

8. The computerized system of claim 1, wherein evaluating the control strategy that dynamically splits power comprises:

determining whether a load coupled to the first and second energy storage systems is providing energy or consuming energy during a current time interval; and in response to determining that the load is providing energy during the current time interval, prioritizing charging the second energy storage system over the first energy storage system.

9. The computerized system of claim 8, wherein prioritizing charging the second energy storage system over the first energy storage system comprises charging the second energy storage system to a charging limit of the second energy storage system.

10. The computerized system of claim 9, wherein evaluating the control strategy that dynamically splits power further comprises:

determining the charging limit of the second energy storage system based, at least in part, on a simulated electrochemical state of the second energy storage system in the current time interval.

11. The computerized system of claim 1, wherein evaluating the control strategy that dynamically splits power comprises:

determining a rate of power increase based on power to be discharged by the first energy storage system in a current time interval and power discharged by the first energy storage system in at least one previous time interval;

determining whether the rate of power increase exceeds a threshold rate of power increase; and limiting the power discharged by the first energy storage system in the current time interval in response to determining that the rate of power increase exceeds the threshold rate of power increase.

12. The computerized system of claim 11, wherein limiting the power discharged by the first energy storage system in the current time interval comprises limiting the power discharged by the first energy storage system to a sum of the power discharged by the first energy storage system in the at least one previous time interval and a product of the threshold rate of power increase and an amount of time between the at least one previous time interval and the current time interval.

13. The computerized system of claim 1, wherein evaluating the control strategy that dynamically splits power comprises:

determining whether a load is providing energy or consuming energy during a current time interval;

in response to determining that the load is consuming energy during the current time interval, determining whether a power requirement of the load in the current time interval is increasing or decreasing from at least one previous time interval; and in response to determining that the power requirement of the load in the current time interval is decreasing:

determining whether the power requirement of the load in the current time interval is above a discharging limit of the first energy storage system; and in response to determining that the power requirement of the load in the current time interval is not above the discharging limit of the first energy storage system, charge the second energy storage system using energy discharged from the first energy storage system in excess of energy provided to the load by the first energy storage system.

14. The computerized system of claim 13, in response to determining that the power requirement of the load in the current time interval is above the discharging limit of the first energy storage system, determining charging/discharging parameters to discharge the first energy storage system to the discharging limit of the first energy storage system, and to discharge the second energy storage system to meet the power requirement of the load in excess of the energy provided by the first energy storage system to the load.

15. A computer-implemented method of designing an electrical storage system, the method comprising:

generating, based on one or more design requirements and information for a plurality of energy storage systems including a first type of energy storage system and a second type of energy storage system different from the first type of energy storage system, a viable configuration space;

determining, using at least one computer processor, for each of multiple pairs of energy storage systems in the plurality of energy storage systems having characteristics that fall within the viable configuration space, a performance measure of the pair, wherein determining the performance measure comprises using simulation to evaluate a control strategy that dynamically splits power provided and/or stored by the first and second energy storage systems in the pair during each of a plurality of time intervals, wherein the simulation predicts a state of health of the first type of energy storage system and/or the second type of energy storage system of the pair after a certain number of charging/discharging cycles under certain conditions; and providing, on a user interface, an indication of a pair of energy storage systems selected based on the performance measure.

16. At least one non-transitory computer readable medium encoded with a plurality of instructions that, when executed by at least one computer processor perform a method, wherein the method comprises:

generating, based on one or more design requirements and information for a plurality of energy storage systems including a first type of energy storage system and a second type of energy storage system different from the first type of energy storage system, a viable configuration space;

determining for each of multiple pairs of energy storage systems in the plurality of energy storage systems having characteristics that fall within the viable configuration space, a performance measure of the pair, wherein determining the performance measure comprises using simulation to evaluate a control strategy that dynamically splits power provided and/or stored by the first and second energy storage systems in the pair during each of a plurality of time intervals, wherein the simulation predicts a state of health of the first type of energy storage system and/or the second type of energy storage system of the pair after a certain number of charging/discharging cycles under certain conditions; and providing, on a user interface, an indication of a pair of energy storage systems selected based on the performance measure.

* * * * *